US012642716B2

(12) United States Patent
Trimble et al.

(10) Patent No.: US 12,642,716 B2
(45) Date of Patent: Jun. 2, 2026

(54) PATIENT TRANSPORT APPARATUS WITH ARTICULABLE POWERED LITTER

(71) Applicant: Stryker Corporation, Kalamazoo, MI (US)

(72) Inventors: Shawn Trimble, Portage, MI (US); Christopher Gentile, Sturgis, MI (US)

(73) Assignee: Stryker Corporation, Portage, MI (US)

( * ) Notice: Subject to any disclaimer, the term of this patent is extended or adjusted under 35 U.S.C. 154(b) by 264 days.

(21) Appl. No.: 18/569,360

(22) PCT Filed: Mar. 30, 2022

(86) PCT No.: PCT/US2022/022452
§ 371 (c)(1),
(2) Date: Dec. 12, 2023

(87) PCT Pub. No.: WO2023/027768
PCT Pub. Date: Mar. 2, 2023

(65) Prior Publication Data

US 2024/0277536 A1 Aug. 22, 2024

Related U.S. Application Data

(60) Provisional application No. 63/237,299, filed on Aug. 26, 2021.

(51) Int. Cl.
*A61G 1/017* (2006.01)
*A61G 1/02* (2006.01)
*A61G 3/02* (2006.01)

(52) U.S. Cl.
CPC .......... *A61G 1/017* (2013.01); *A61G 1/0293* (2013.01); *A61G 3/0254* (2013.01)

(58) Field of Classification Search
None
See application file for complete search history.

(56) References Cited

U.S. PATENT DOCUMENTS 7,398,571 B2 7/2008 Souke et al.
8,439,416 B2 5/2013 Lambarth et al.
9,486,373 B2 11/2016 Lambarth et al.
9,510,981 B2 12/2016 Lambarth et al.
(Continued)

OTHER PUBLICATIONS

International Search Report for Application No. PCT/US2022/022452 dated Jul. 20, 2022, 2 pages.

*Primary Examiner* — Joseph D. Pape
(74) *Attorney, Agent, or Firm* — Howard & Howard Attorneys PLLC

(57) ABSTRACT

A patient transport apparatus for patients. The patient transport apparatus comprises a base having a base frame and an intermediate frame. The patient support further comprises a litter configured to be docked to and undocked from a trolley that is configured to slidably translate along the intermediate frame between a plurality of positions including a trolley forward position and a trolley docking position. The litter is configured to be supported by the base in a cantilevered position when the trolley is in the trolley docking position. The base includes and auxiliary guide and the litter includes an auxiliary roller assembly configured to engage the auxiliary guide to provide an auxiliary point of contact to support the litter when the litter is docked to the trolley.

16 Claims, 30 Drawing Sheets

(56) References Cited

U.S. PATENT DOCUMENTS

| | | | | |
|---|---|---|---|---|
| 10,098,796 | B2 * | 10/2018 | Valentino | A61G 1/0212 |
| 10,744,049 | B2 | 8/2020 | Naber et al. | |
| 10,758,437 | B2 | 9/2020 | Lucas et al. | |
| 10,857,047 | B2 | 12/2020 | Furman et al. | |
| 11,298,279 | B2 | 4/2022 | Trimble et al. | |
| 2015/0196442 | A1 * | 7/2015 | Heil | A61G 7/012<br>5/613 |
| 2018/0028383 | A1 | 2/2018 | Stryker et al. | |
| 2018/0369036 | A1 | 12/2018 | Furman et al. | |
| 2020/0179191 | A1 | 6/2020 | Trimble et al. | |
| 2020/0179199 | A1 | 6/2020 | Feliksa | |
| 2021/0030606 | A1 | 2/2021 | Xu et al. | |

* cited by examiner

PATIENT TRANSPORT APPARATUS WITH ARTICULABLE POWERED LITTER

CROSS-REFERENCE TO RELATED APPLICATIONS

The subject patent application claims priority to and all the benefits of U.S. Provisional Patent Application No. 63/237,299, filed on Aug. 26, 2021, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, chairs, stair chairs, and the like. Many conventional patient transport apparatuses, such as for example cots, generally include a base arranged for movement about floor surfaces, and a litter upon which a patient can be positioned or otherwise supported. Here, one or types of lift mechanisms may be employed to facilitate adjusting a vertical position of the litter relative to the base to, among other things, promote patient care, load the patient transport apparatus into an ambulance, and the like.

Conventional cots may employ one or more articulable deck sections arranged to define a patient support surface that can be adjusted to support the patient between different patient positions. For example, cots may employ an adjustable backrest or fowler deck section that can be adjusted to support the patient between a supine position, a fowler's position, and one or more other patient positions. In some cots, additional sections such a leg section, a seat section, and/or other sections may be provided to facilitate adjusting the patient support surface to other patient positions, such as a gatch position.

While patient transport apparatuses have generally performed well for their intended purpose, there remains a need in the art for patient support surfaces that can be adjusted to support patients in a number of different patient positions to improve patient care during transport.

SUMMARY

The present disclosure is directed towards a patient support apparatus for supporting a patient. The patient support apparatus includes a base having a head end and a foot end. The base has a base frame arranged for movement about a ground surface, and an intermediate frame operatively coupled to the base frame and defining an intermediate rail extending between the foot end and the head end. The intermediate frame includes an auxiliary guide arranged below the intermediate rail. A trolley is configured to translate along the intermediate rail between a plurality of trolley positions including a trolley forward position where the trolley is arranged at the head end of the base, and a trolley docking position where the trolley is arranged at the foot end of the base. A litter is configured to be docked to and undocked from the trolley such that, when docked to the trolley, the litter is supported by the trolley and is configured to slidably translate relative to the intermediate frame between a plurality of litter positions including a litter forward position, where the trolley is in the trolley forward position, and a cantilevered position, where the trolley is in the trolley docking position such that litter is cantilevered off the foot end of the base. The litter includes a patient support surface for supporting the patient, and an auxiliary roller assembly coupled to and extending from the litter and arranged for engagement with the auxiliary guide to provide an auxiliary point of contact to support the litter when the litter is docked to the trolley and the trolley is in the trolley forward position.

DETAILED DESCRIPTION

Figure 1A:
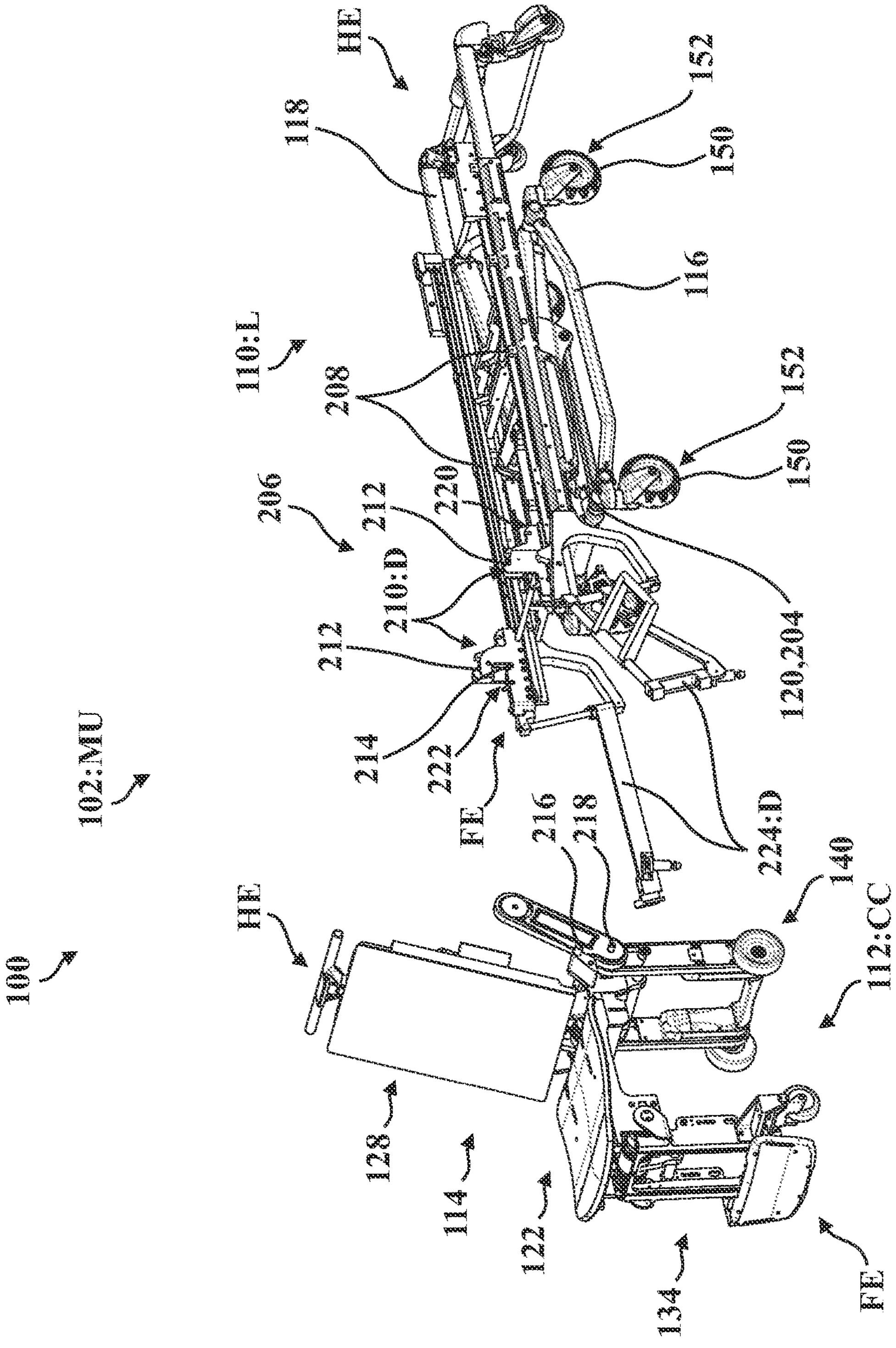
FIG. 1A is a perspective view of a patient transport apparatus of a patient support system of the present disclosure, shown with the patient transport apparatus operating in an undocked mode with a base having stabilizers arranged in a deployed configuration to brace the base against floor surfaces for loading a litter, the litter shown positioned adjacent to the base and arranged in a chair configuration.
Figure 1B:
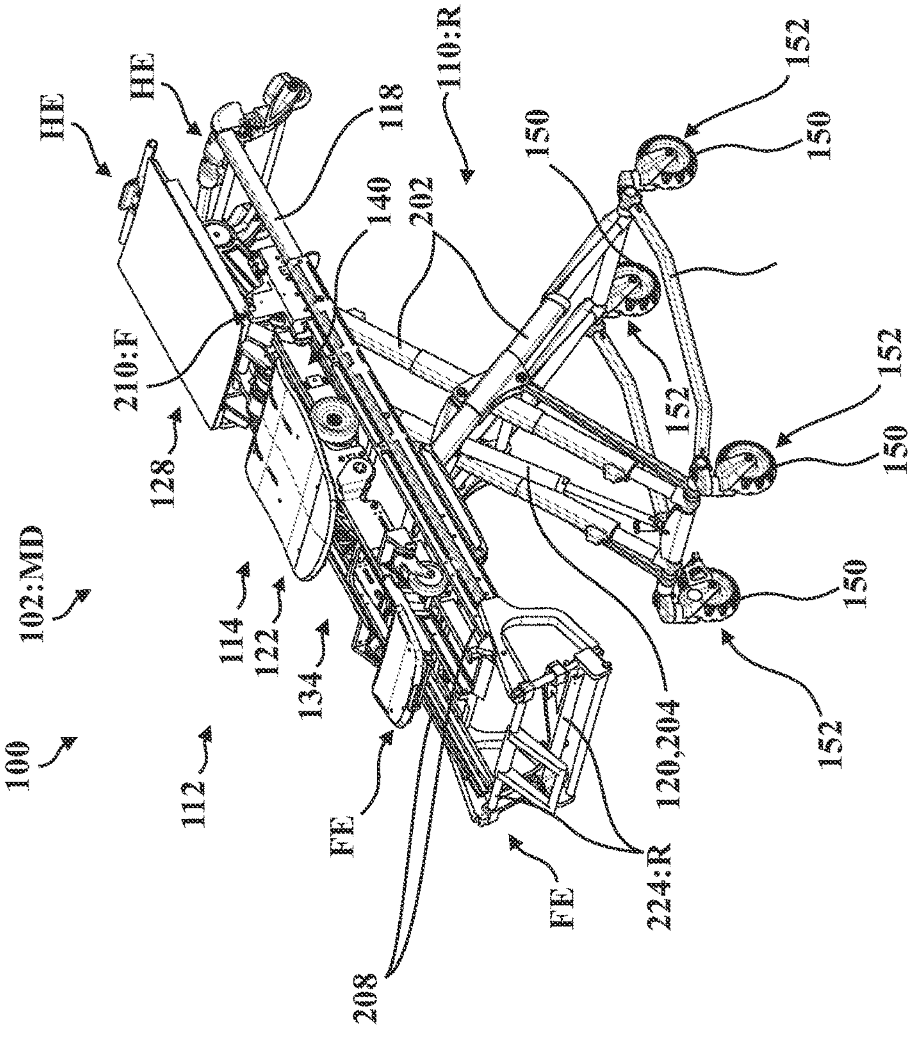
FIG. 1B is another perspective view of the patient transport apparatus of FIG. 1A, shown with the patient transport apparatus operating in a docked mode with the litter secured to the base and with the stabilizers arranged in a retracted configuration.
Figure 4A:
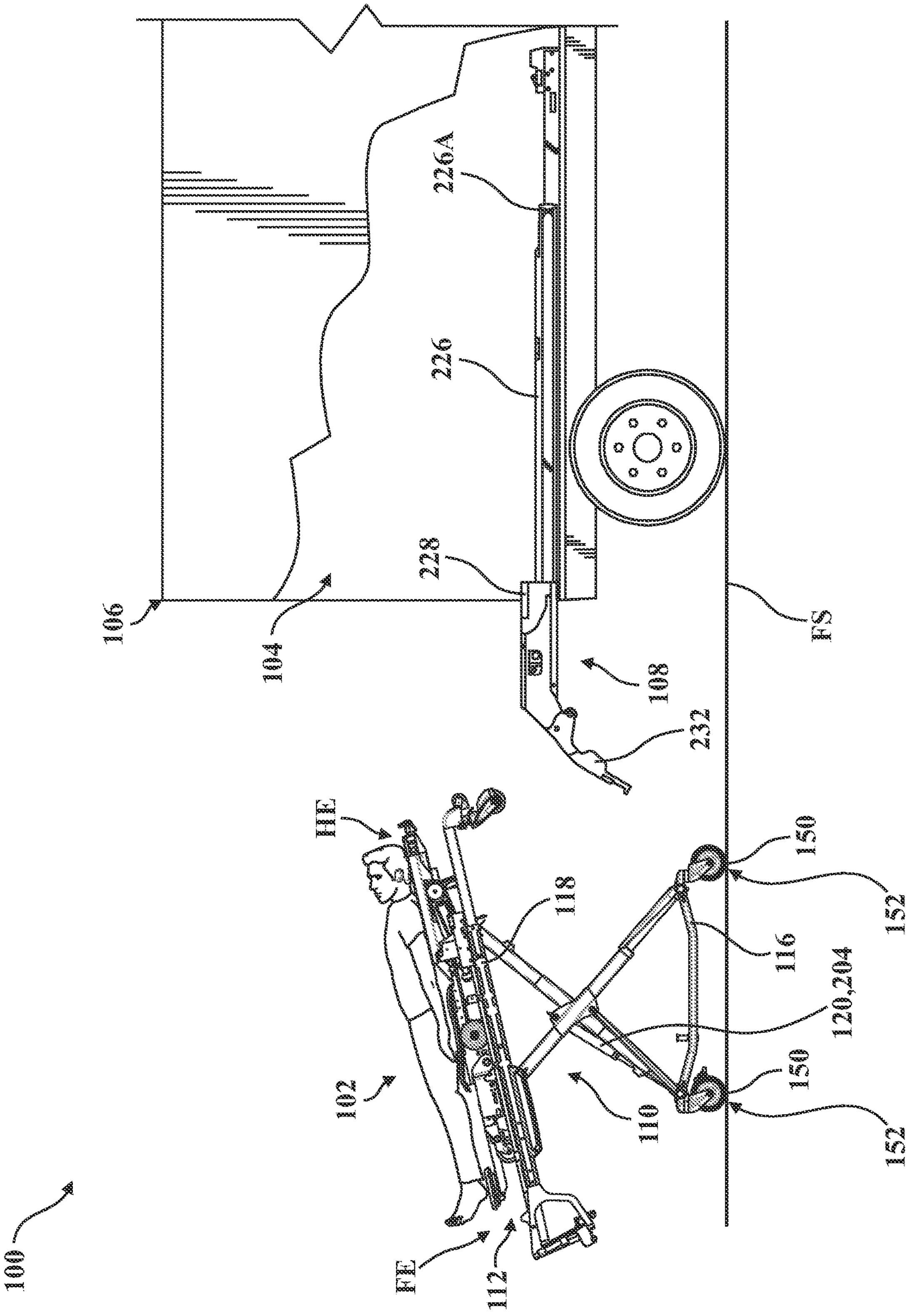
FIG. 4A is another side view of the patient transport apparatus of FIGS. 1A-3G, shown positioned adjacent to a cargo area of an ambulance to which a power load device is secured, with the base of the patient transport apparatus shown arranged in a raised configuration.

Referring to FIGS. 1A-1B and 4A, portions of a patient support system 100 are shown including a patient transport apparatus 102 for supporting a patient in a health care setting according to aspects of the present disclosure. In some versions, the patient transport apparatus 102 is configured to be loaded into a cargo area 104 of an ambulance 106, such as via a power load device 108 (see FIGS. 4A-4C). As will be appreciated from the subsequent description below, while the illustrated versions of the patient transport apparatus 102 described herein are configured as cots for transporting patients, the patient transport apparatus 102 may comprise a hospital bed, a stretcher, a table, a wheelchair, a chair, or a similar apparatus utilized in the care of a patient. The version of the patient transport apparatus 102 shown in FIGS. 1A-1B generally comprises a base 110 and a litter 112. The litter 112 defines or otherwise comprises a patient support surface 114 to support a patient.

In some versions, the patient transport apparatus 102 may comprise a reconfigurable patient support as described in U.S. Pat. No. 9,486,373, which is hereby incorporated by reference in its entirety. In some versions, the patient transport apparatus 102 may comprise a reconfigurable transport apparatus as described in U.S. Pat. No. 9,510,981, which is hereby incorporated by reference in its entirety. In some versions, the patient transport apparatus 102 may comprise a person support apparatus system as described in U.S. Patent Application Publication No. 2018/0028383, which is hereby incorporated by reference in its entirety. In some versions, the patient transport apparatus 102 may comprise a patient transfer apparatus with integrated tracks as described in U.S. patent application Ser. No. 15/854,943, which is hereby incorporated by reference in its entirety. In some versions, the patient transport apparatus 102 may comprise a variable speed patient transfer apparatus as described in U.S. patent application Ser. No. 15/854,199, which is hereby incorporated by reference in its entirety. In some versions, the patient transport apparatus 102 may comprise a patient transfer apparatus as described in U.S. patent application Ser. No. 15/855,161, which is hereby incorporated by reference in its entirety. In some versions, the patient transport apparatus 102 may comprise an ambulance cot as described in U.S. Pat. No. 7,398,571, which is hereby incorporated by reference in its entirety.

With continued reference to FIGS. 1A-1B, the base 110 and litter 112 each have a head end HE and a foot end FE corresponding to designated placement of the patient's head and feet on the patient transport apparatus 102. In FIG. 1A, the litter 112 is shown separated from the base 110; as is described in greater detail below, the base 110 is configured to removably receive and support the litter 112 in certain situations. Put differently, in the illustrated version, the litter 112 is configured for releasable attachment to the base 110. The base 110 generally includes a base frame 116, an intermediate frame 118, and a base lift device 120. The intermediate frame 118 is spaced above the base frame 116 and is moved relative to the base frame 116 via the base lift device 120 as described in greater detail below. Although not illustrated in detail in the drawings, a mattress (or sections thereof) may be disposed on or integral with the litter 112. In such circumstances, the mattress comprises or otherwise defines a secondary patient support surface 114 upon which the patient is supported.

As will be described in greater detail below in connection with FIGS. 3A-8, in the illustrated versions, the litter 112 employs a plurality of assemblies, some of which are capable of being articulated relative to others in various ways and under certain operating conditions to adjust the patient support surface 114 and to facilitate docking to and undocking from the base 110. In the illustrated version, the litter 112 generally includes a seat assembly 122 with a seat frame 124 and a seat section 126, a fowler assembly 128 with a fowler frame 130 and a fowler section 132, a front assembly 134 with a front frame 136 and a front section 138, a rear assembly 140 with a rear frame 142, and a ski assembly 144. Each of the assemblies 122, 128, 134, 140, 144 introduced above will be described in greater detail below.

In the illustrated versions, the fowler assembly 128 pivots relative to the seat assembly 122 about a fowler axis XW, the front assembly 134 pivots relative to the seat assembly 122 about a front axis XF, and the rear assembly 140 pivots relative to the seat assembly 122 about a rear axis XR. In addition, the ski assembly 144 pivots about the rear axis XR as described in greater detail below, but could pivot about other axes in some configurations. In the illustrated version, the seat section 126, the fowler section 132, and the front section 138 each provide support to the patient and, thus, generally cooperate to define the patient support surface 114. In the illustrated version, the front section 138 is also configured to translate along the front frame 136, such as is described in U.S. patent application Ser. No. 16/705,878, the disclosure of which is hereby incorporated by reference in its entirety. It will be appreciated that the fowler section 132 and the front section 138 may pivot relative to the seat section 126, or may articulate relative to the seat section 126 in any manner. For instance, the fowler section 132 and/or the front section 138 may both pivot and translate relative to the seat section 126 in some configurations.

Caregiver interfaces 148, such as handles, help facilitate movement of the patient transport apparatus 102 over floor surfaces. Here, caregiver interfaces 148 may be coupled to the fowler assembly 128, the front assembly 134 (not shown), the intermediate frame 118, and the like. Additional caregiver interfaces 148 may be integrated into other components of the patient transport apparatus 102. The caregiver interfaces 148 are graspable by the caregiver to manipulate the patient transport apparatus 102 for movement.

Base wheels 150 are coupled to the base frame 116 to facilitate transport over floor surfaces. The base wheels 150 are arranged in each of four quadrants of the base 110 adjacent to corners of the base frame 116. In the illustrated versions, the base wheels 150 are caster wheels, which are able to rotate and swivel relative to the base frame 116 during transport. Each of the base wheels 150 forms part of a base caster assembly 152. Each base caster assembly 152 is mounted to the base frame 116. It should be understood that various configurations of base caster assemblies 152 are contemplated. In addition, in some configurations, the base wheels 150 are not caster wheels and may be non-steerable, steerable, non-powered, powered, or combinations thereof. Additional base wheels 150 are also contemplated. For example, the patient transport apparatus 102 may comprise four non-powered, non-steerable wheels, along with one or more powered wheels. In some cases, the patient transport apparatus 102 may not include any wheels. In other configurations, one or more auxiliary wheels (powered or non-powered), which are movable between stowed positions and deployed positions, may be coupled to the base frame 116. In some cases, when these auxiliary wheels are located between caster assemblies and contact the floor surface FS in the deployed position, they cause two of the base caster assemblies 152 to be lifted off the floor surface thereby shortening a wheel base 110 of the patient transport apparatus 102. A fifth wheel may also be arranged substantially in a center of the base 110. Other configurations are contemplated.

It should be noted that in many of the drawings described herein, certain components of the patient transport apparatus 102 have been omitted from view for convenience of description and case of illustration.

Figure 2:
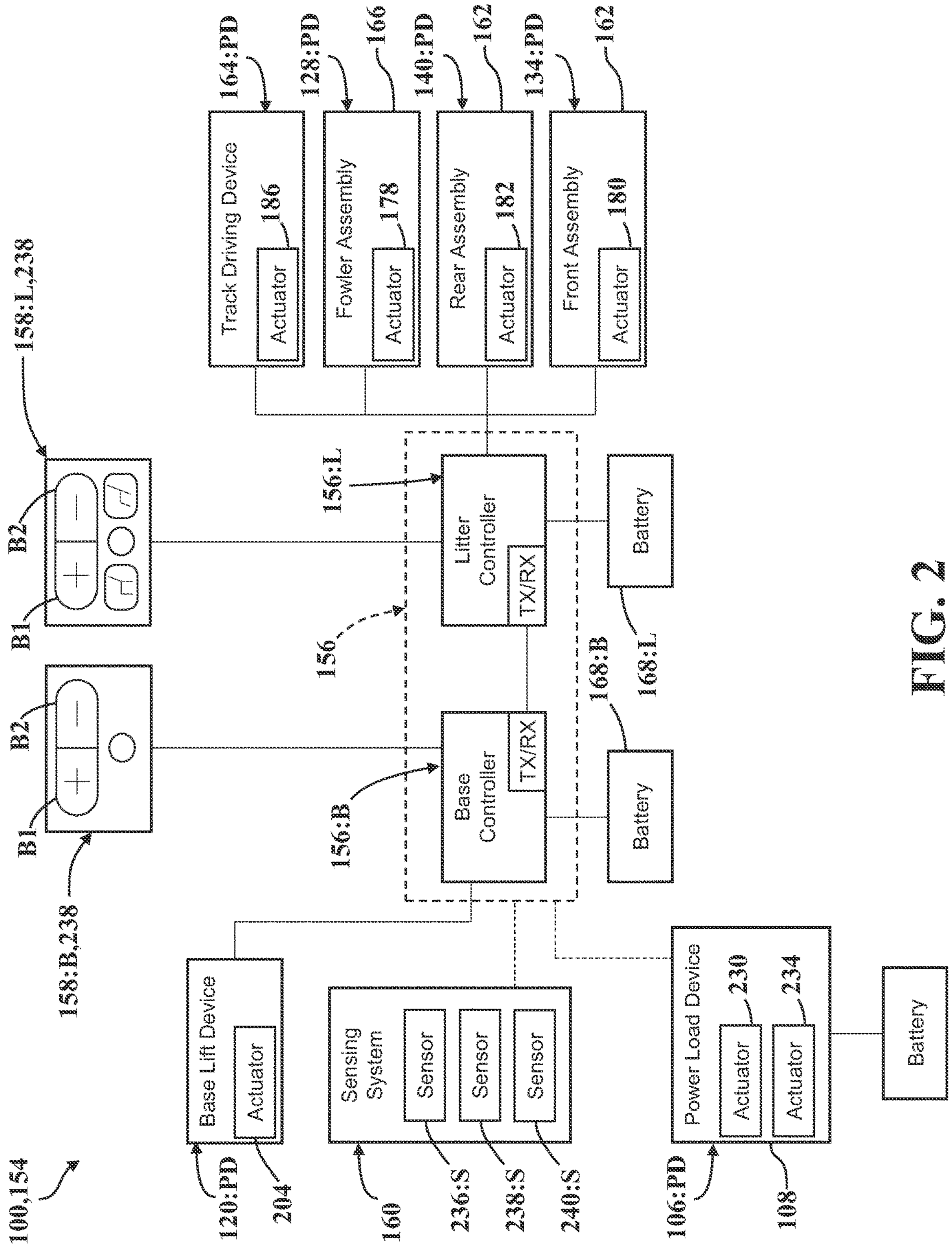
FIG. 2 is a schematic view of a control system of the patient transport apparatus of FIGS. 1A-1B.

Referring now to FIG. 2, a control system 154 of the patient transport apparatus 102 is shown schematically. The control system 154 generally comprises one or more powered devices PD operated by a base controller 156B and/or a litter controller 156L (collectively referred to herein as "controller 156") in response to actuation of a base user interface 158B and/or a litter user interface 158L (collectively referred to herein as "user interface 158") in response to state signals received from a sensing system 160. Each of these components will be described in greater detail below.

With continued reference to FIG. 2, each of the one or more powered devices PD of the control system 154 is configured to perform one or more predetermined functions. To this end, the powered devices PD employ one or more components that utilize electricity in order to perform functions. One or more powered devices PD of the patient support system 100 and/or the patient transport apparatus 102 may comprise powered adjustment devices, such as the power load device 108, the base lift device 120, a litter lift device 162, a track driving device 164, and a fowler section adjustment device 166. To this end, in some versions, the base 110 employs a base energy storage device 168B and the litter 112 employs a litter energy storage device 168L (collectively referred to herein as "energy storage device 168"). Other powered devices PD are also contemplated.

The powered devices PD may have many possible configurations for performing the predetermined functions of the patient transport apparatus 102. As will be appreciated from the subsequent description below, powered devices PD may cooperate with or otherwise form a part of the patient transport apparatus 102 in certain versions. Exemplary configurations of some of the powered devices PD are described in greater detail below. One or more actuators may be used to effectuate functions of each powered device PD. It should be understood that numerous configurations of the powered devices PD, other than those specifically described herein, are contemplated. Exemplary scenarios of how certain powered devices PD may be utilized are also described below. However, numerous other scenarios not described herein are also contemplated.

The litter 112 of the present disclosure is configured to be removably attached to the intermediate frame 118 of the base 110, as noted above and as is described in greater detail below, and is generally operable between: an undocked mode MU (see FIG. 1A) where the litter 112 supports the patient for movement independent of the base 110, and a docked mode MD (see FIG. 1B) where the litter 112 support the patient for movement concurrent with the base 110. The process of moving between the undocked mode MU and the docked mode MD is described in greater detail below in connection with FIGS. 3A-3G. While operating in the undocked mode MU, the litter 112 is operable between a loft configuration CL (see FIG. 7A), a chair configuration CC (see FIG. 7C), and a stair configuration CS (see FIGS. 7D-8). While operating in the docked mode MD, portions of the litter 112 may be articulable to adjust the patient support surface 114, such as by moving the fowler assembly 128. Other configurations are contemplated.

Figure 7A:
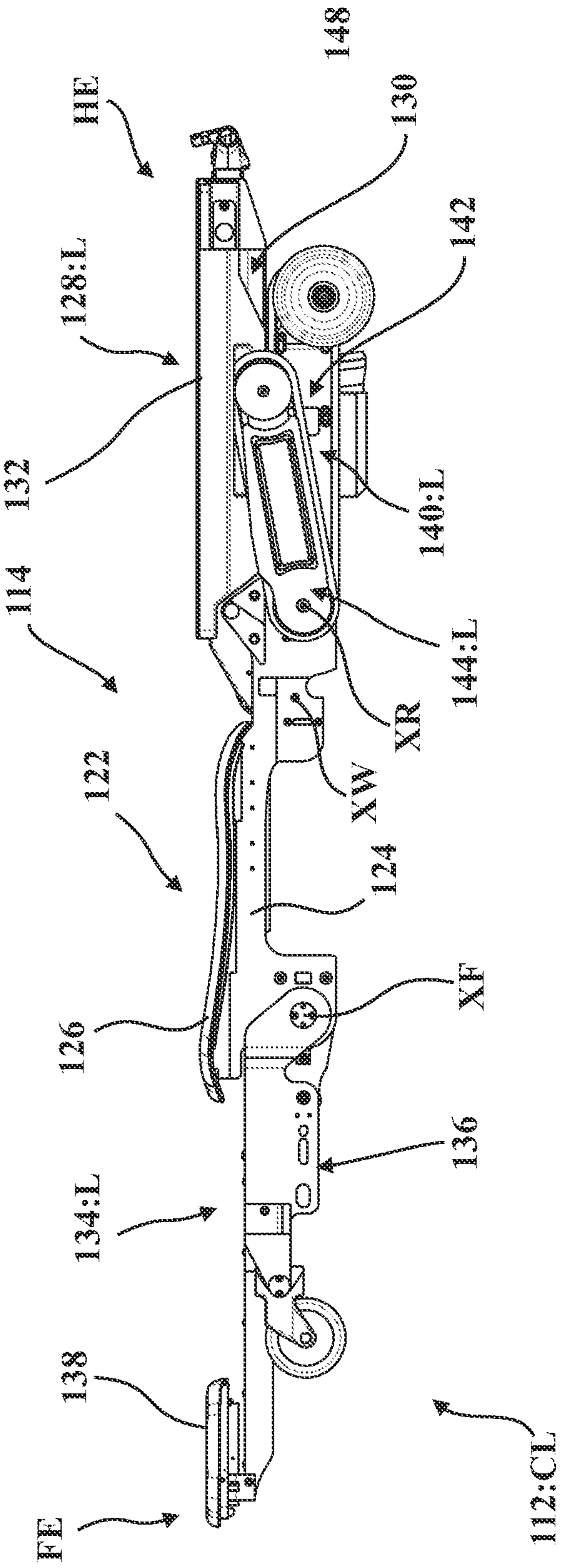
FIG. 7A is a side view of the litter of the patient transport apparatus of FIGS. 1A-6, shown arranged in a loft configuration.
Figure 7B:
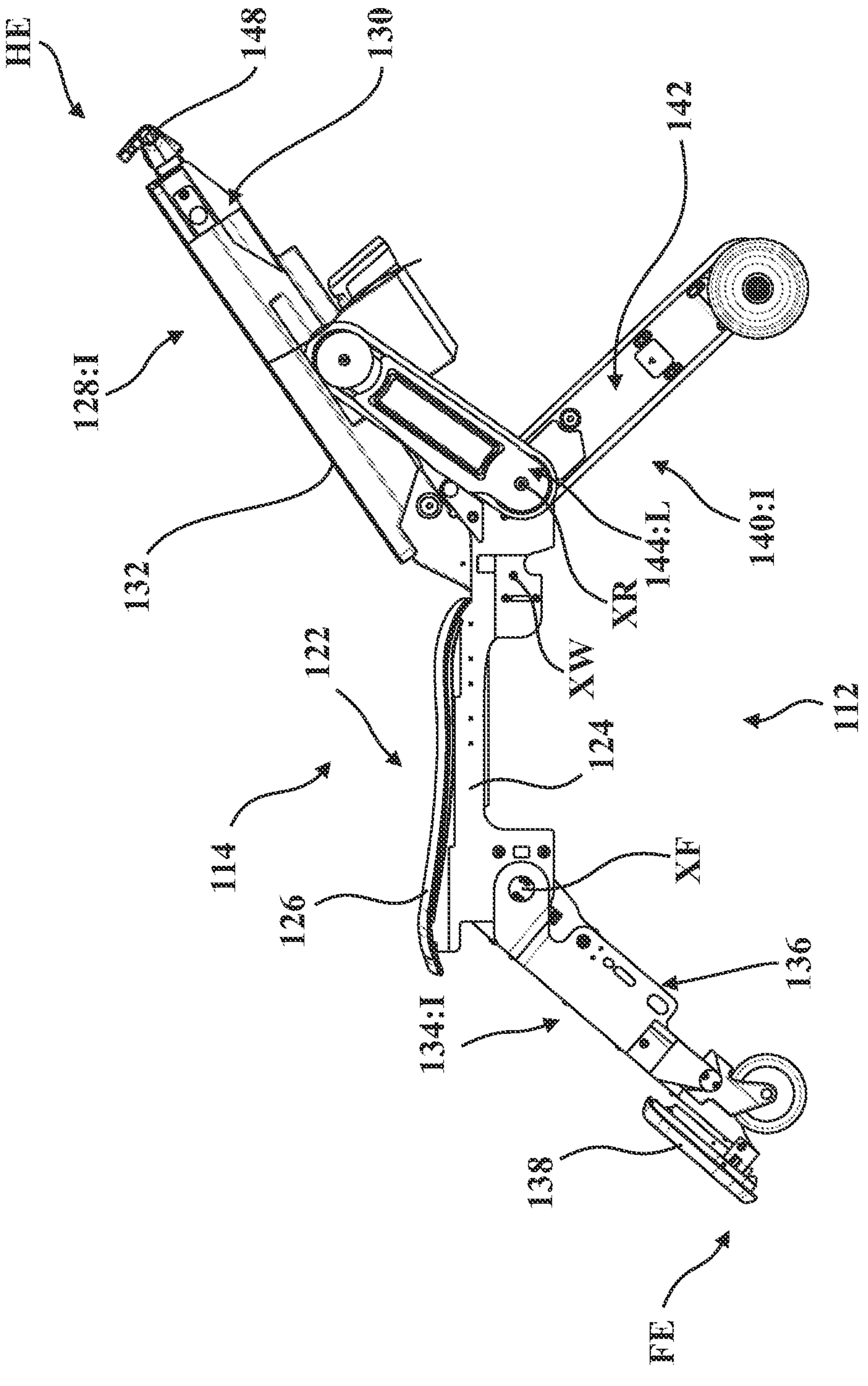
FIG. 7B is another side view of the litter of FIG. 7A shown transitioning between the loft configuration and the chair configuration.
Figure 7C:
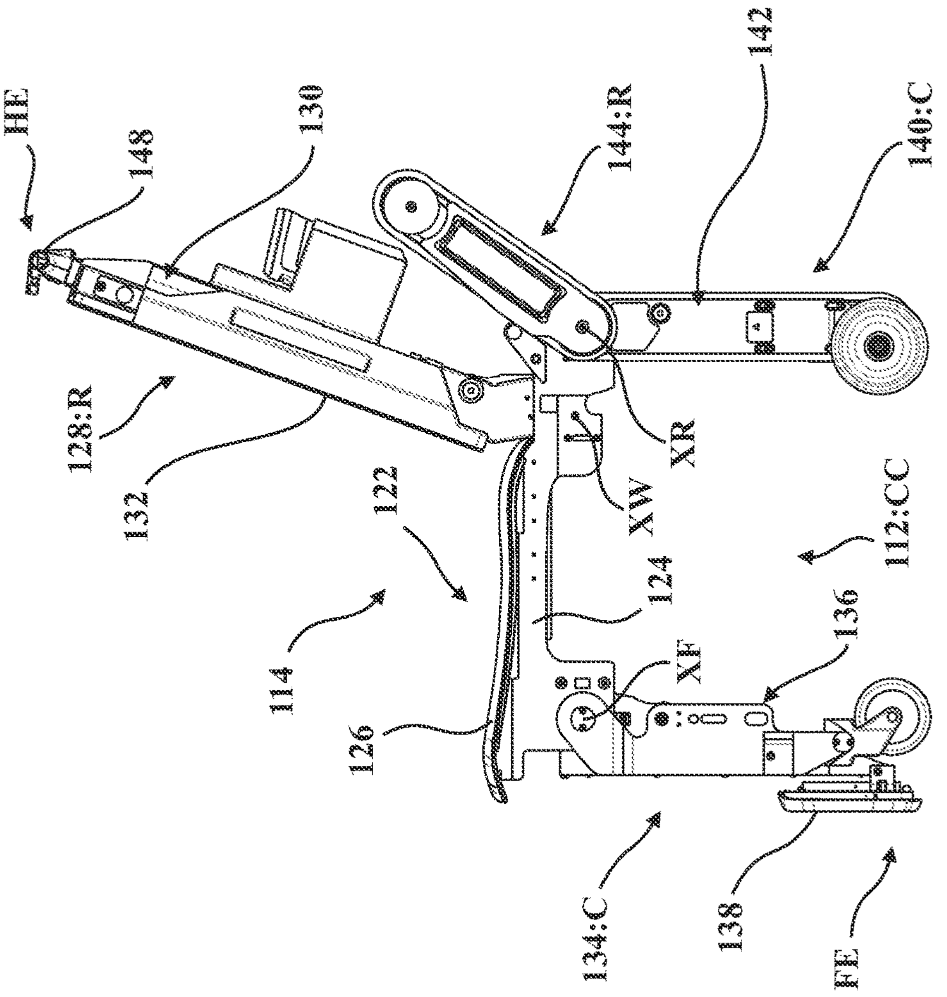
FIG. 7C is another side view of the litter of FIGS. 7A-7B shown arranged in the chair configuration.
Figure 7D:
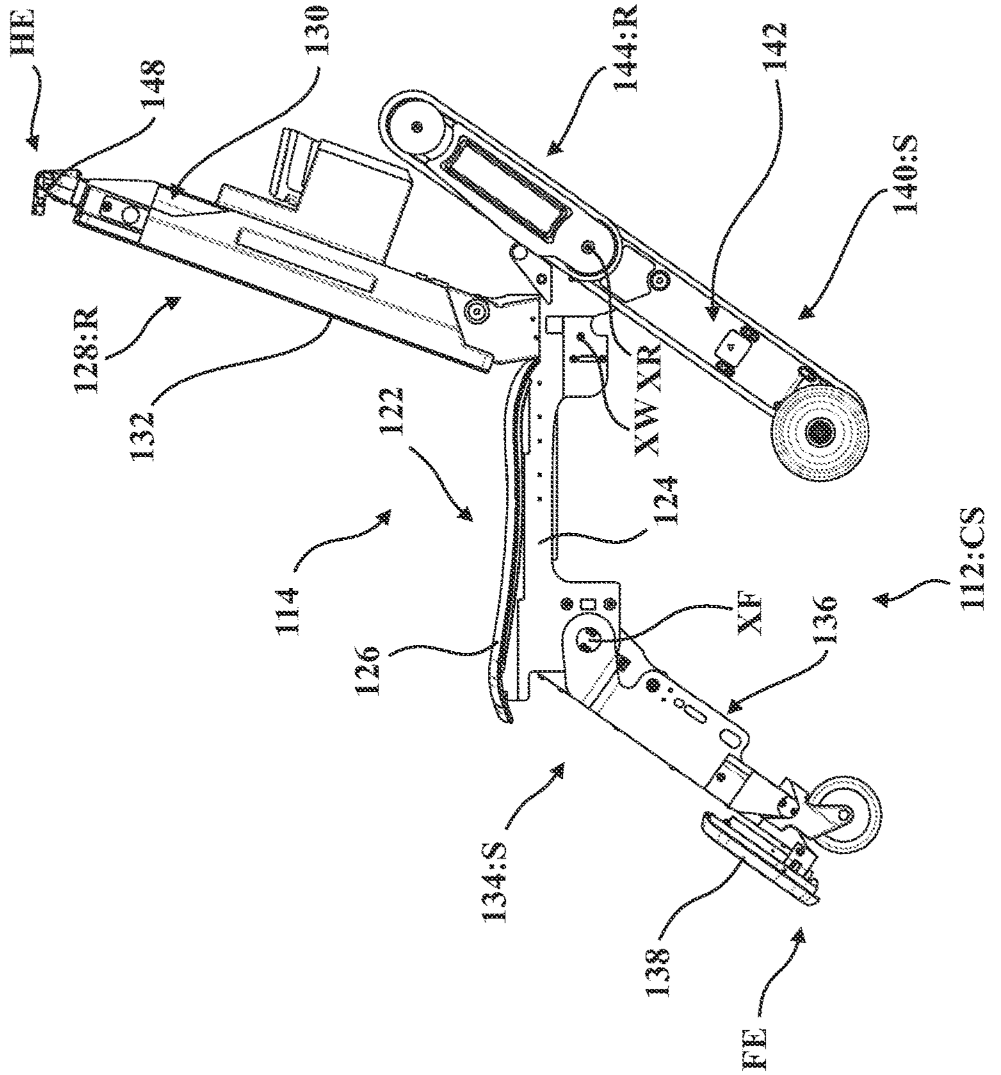
FIG. 7D is another side view of the litter of FIGS. 7A-7C shown arranged in a stair configuration.
Figure 8:
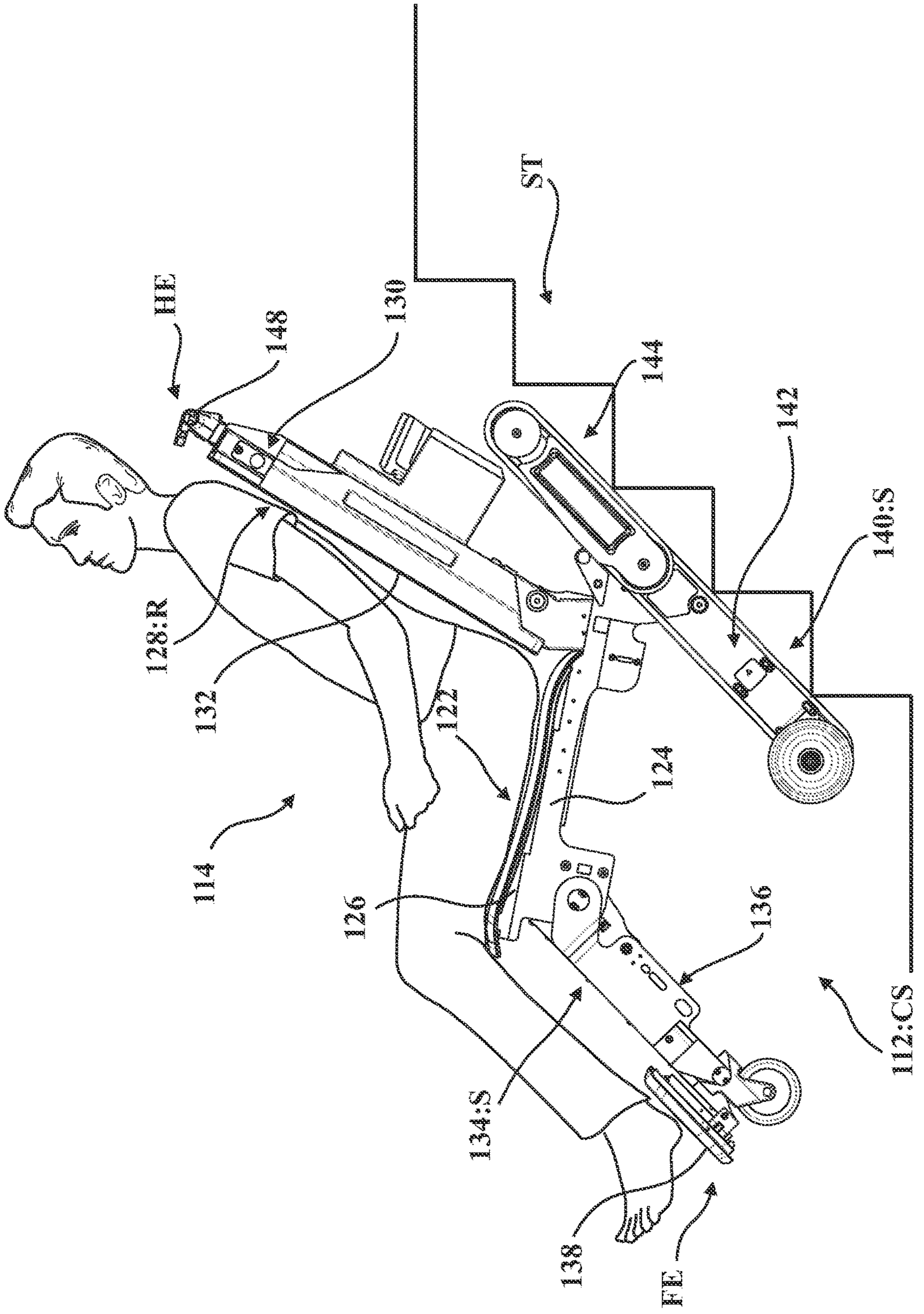
FIG. 8 is another side view of the litter of FIGS. 7A-7D shown arranged in the stair configuration supporting a patient for transport along stairs.
Figure 9A:
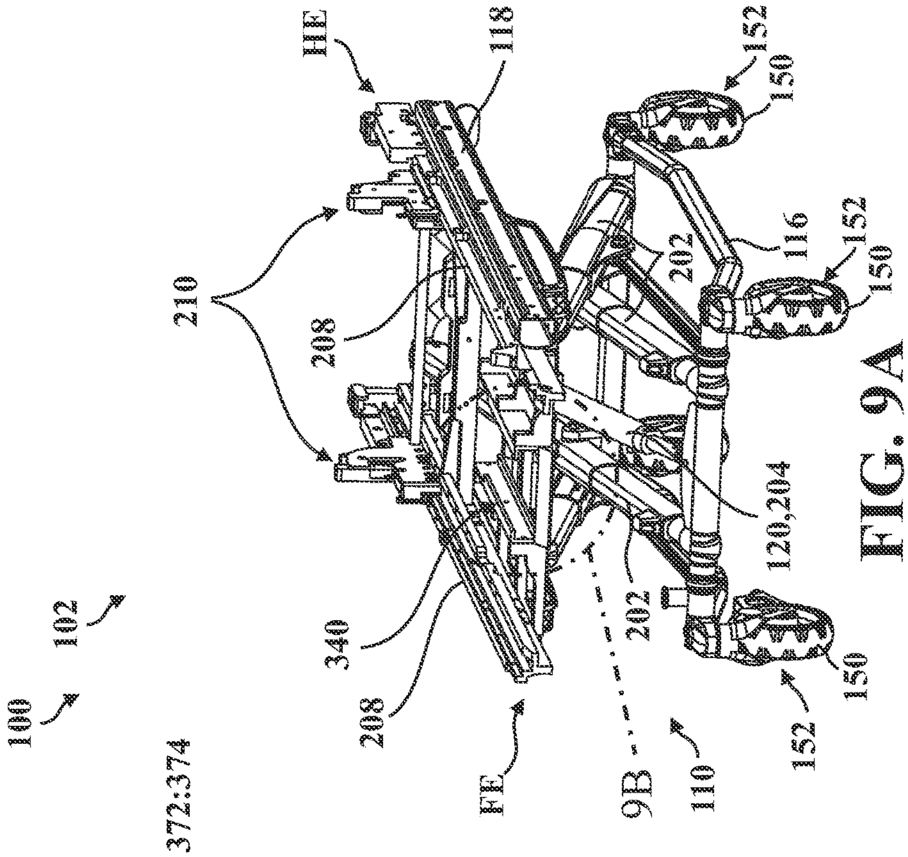
FIG. 9A is a front perspective view of portions of the base of the patient transport apparatus of FIGS. 1A-4C, depicting the base in the undocked mode, the base shown having an auxiliary guide, and with the base shown depicted raised from the maximum lowered configuration for illustrative purposes.
Figure 9B:
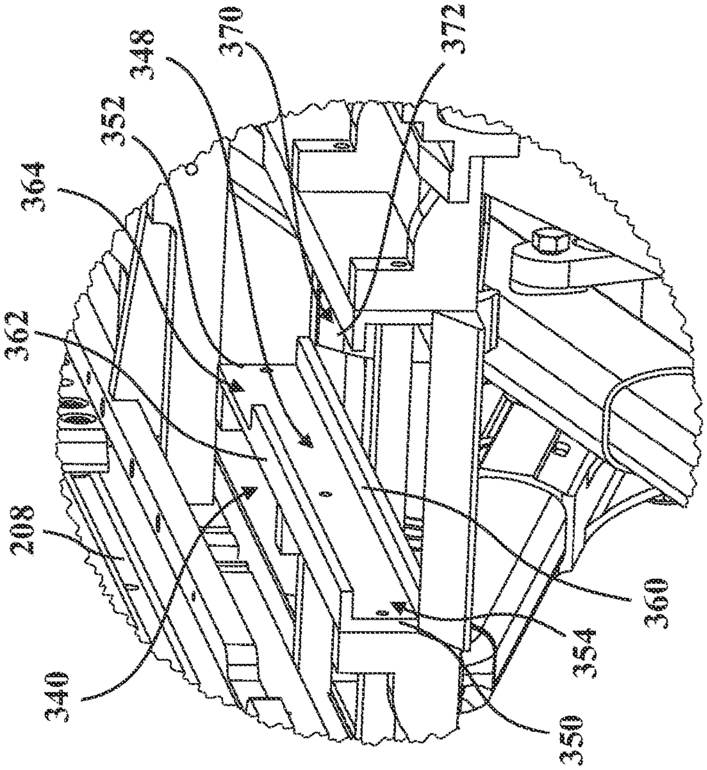
FIG. 9B is an enlarged partial perspective view taken at indicia 9B in FIG. 9A.

In the version shown in FIGS. 7C-8, when operating in and between the chair and stair configurations CC, CS, the litter 112 is configured to serve as a mobile chair to transport the patient along floor surfaces FS as well as up and down stairs ST. Mobile chairs (sometimes called "stair chairs") are used to evacuate patients from buildings where patient accessibility is limited, such as buildings having more than one floor. As noted above, the patient support surface 114 of the litter 112 of the illustrated patient transport apparatus 102 is generally defined by the fowler section 132, the seat section 126, and the front section 138. Here, the seat section 126 is supported by the seat frame 124, and the fowler section 132 is supported by the fowler frame 130 that is coupled to the seat frame 124 such that the fowler frame 130 may pivot or otherwise articulate relative to the seat frame 124. The front section 138 is supported by the front frame 136 which is coupled to the seat frame 124 such that the front frame 136 may pivot or otherwise articulate relative to the seat frame 124. Here too, the rear assembly 140 is coupled to the seat frame 124 such that the rear frame 142 may pivot or otherwise articulate relative to the seat frame 124.

In some configurations, the seat frame 124 may include seat frame members 170 spaced laterally apart from and fixed relative to each other. Similarly, the fowler frame 130 may include fowler frame members 172 spaced laterally apart and fixed relative to each other. The front frame 136 may include front legs 174 spaced laterally apart and fixed relative to each other, and the rear frame 142 may include rear legs 176 spaced laterally apart and fixed relative to each other. In the illustrated version, the litter 112 comprises a fowler actuator 178, a front actuator 180, and a rear actuator 182 which are each driven by the controller 156 (e.g., by the litter controller 156L) and are operatively attached to the seat assembly 122 to facilitate respectively pivoting or otherwise articulating the fowler assembly 128, the front assembly 134, and the rear assembly 140 relative to the seat assembly 122.

In the illustrated versions, the fowler assembly 128 is movable via the fowler actuator 178 between a fowler raised position 128R (see FIGS. 7D-7E), a fowler lowered position 128L (see FIG. 7A), and one or more intermediate fowler positions 1281 (see FIG. 7B) between the fowler raised position 128R and the fowler lowered position 128L.

As noted above, the illustrated patient transport apparatus 102 employs the track driving device 164, which is configured to assist users in traversing a flight of stairs ST by mitigating the load users (e.g., caregivers) would otherwise be required to lift via caregiver interfaces 148 (see FIG. 8; not shown in detail). In some configurations, the track driving device 164 may be configured to move the litter 112 across the floor surface FS (not shown). The track driving device 164 is formed as a part of the rear legs 176 of the rear assembly 140. Here, each rear leg 176 includes a respective track frame member 184 coupled to the seat frame 124 for pivoting movement about the rear axis XR. The track driving device 164 also includes track actuators 186 which drive continuous leg tracks 188 rotatably coupled to the respective leg track frame members 184. The track actuators 186 are coupled to the track frame members 184 and are coupled to (or otherwise disposed in communication with) the controller 156 to drive the leg tracks 188 for ascending and descending stairs ST (see FIG. 8). The track driving device 164 may be configured to operate in the same manner or a similar manner as those shown in U.S. Pat. Nos. 7,398,571, 9,486,373, 9,510,981, and/or U.S. Patent Application Publication No. 2018/0028383, previously referenced.

The rear assembly 140 also includes rear wheels 190 rotatably coupled to each of the track frame members 184 that are configured to be disposed in contact with the floor surface FS, such as to support the litter 112 for movement in the chair configuration CC. In the illustrated versions, the rear wheels 190 are freely rotatable. In alternative versions, the rear wheels 190 may be powered drive wheels coupled to the controller 156. Other configurations are contemplated. The components of the track driving device 164 are arranged such that the leg track frame members 184, the leg tracks 188, and the rear wheels 190 move together with the rear assembly 140 which, as noted above, is arranged to selectively pivot about the rear axis XR to facilitate changing between the various configurations of the litter 112 as well as to facilitate docking and undocking from the base 110. As will be described in greater detail below, the rear assembly 140 is movable via the rear actuator 182 between a rear assembly loft position 140L (see FIG. 7A), a rear assembly chair position 140C (see FIG. 7C), a rear assembly stair position 140S (see FIGS. 7D-8), a rear assembly dock position 140D (see FIG. 3D), and one or more intermediate rear assembly positions 1401 (see FIG. 7B) between the rear assembly loft position 140L and the rear assembly dock position 140D.

In some versions, the ski assemblies 144 serve as extensions to the track driving device 164 and likewise help facilitate engagement with stairs ST. To this end, in the illustrated versions, the ski assemblies 144 each include respective ski track frame members 192 operatively attached to the seat frame 124 for pivoting movement about the rear axis XR (or another axis). Here too, the track actuators 186 drive continuous ski tracks 194 rotatably coupled to the respective ski track frame members 192. In some versions, the ski assemblies 144 are arranged for pivoting movement between a plurality of ski positions, including a raised ski position 144R (sec FIGS. 7C-7D), a lowered ski position 144L (see FIG. 7A), and one or more intermediate ski positions 144I between the raised ski position 144R and the lowered ski position 144L (see FIG. 7B). In some versions, abutment with the fowler assembly 128 moves the ski assemblies 144. However, other configurations are contemplated.

The front legs 174 of the front assembly 134 support respective front wheels 196, which are realized as part of respective front caster assemblies 198 arranged to facilitate movement of the litter 112 in the chair configuration CC (see FIGS. 5-6 and 7C), as well as to facilitate transitioning between the chair configuration CC and the stair configuration CS (compare FIGS. 7C-7D). In the illustrated versions, the front wheels 196 are freely rotatable, but could be motorized, braked, and the like in some versions. As noted above, in some versions, the front section 138 may be translatable along the front frame 136, such as when the litter 112 moves between the loft configuration CL and the chair configuration CC (compare FIGS. 7A-7D), and/or when the litter 112 operates in the docked mode MD (see FIG. 4A). To this end, the front assembly 134 may include an extension mechanism, generally indicated at 200, configured to longitudinally position the front section 138 relative to the front legs 174. While not depicted in detail herein, the extension mechanism 200 may be similar to as is described in U.S. patent application Ser. No. 16/705,878, the disclosure of which is incorporated by reference in its entirety. As will be described in greater detail below, the front assembly 134 is movable via the front actuator 180 between a front assembly loft position 134L (see FIG. 7A), a front assembly chair position 134C (see FIG. 7C), a front assembly stair position 134S (see FIGS. 7D-8), and one or more intermediate front assembly positions 1341 (see FIG. 7B) between the front assembly loft position 134L and the front assembly dock position 134D.

The litter lift device 162 is coupled to the litter 112 and is configured to raise and lower the patient between minimum and maximum heights of the litter 112, and to generally facilitate movement between the loft configuration CL, the chair configuration CC, and the stair configuration CS when the litter 112 is separated from the base 110 (see FIGS. 7A-7D). To this end, the illustrated litter lift device 162 generally includes the front actuator 180 and the rear actuator 182. The base lift device 120 is coupled to the base 110 and is configured to raise and lower the patient between a plurality of vertical configurations including a maximum raised configuration 110R (see FIG. 1B), a maximum lowered configuration 110L (see FIG. 1A), and a plurality of vertical configurations therebetween, both while the litter 112 is supported by the base 110 and, in some versions, while the litter 112 is undocked from the base 110.

In the representative version illustrated in FIGS. 1A-1B, the base 110 comprises one or more lift arms 202 coupling the intermediate frame 118 to the base frame 116. The base lift device 120 comprises one or more base lift actuators 204 coupled to at least one of the base frame 116 and the intermediate frame 118 to raise and lower the intermediate frame 118 and litter 112 relative to the floor surface FS and the base frame 116. The base lift device 120 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

The base 110 of the patient transport apparatus 102 also generally includes a docking subassembly 206 operatively coupled to the intermediate frame 118. Here, the docking subassembly 206 includes intermediate rails 208 which support a trolley 210 for translation between a trolley forward position 210F where the trolley 210 is arranged at the head end HE of the base 110, and a trolley docking position 210D where the trolley 210 is arranged at the foot end FE of the base 110. The trolley 210 includes or otherwise defines upper and lower pin stops 212, 214 which are arranged to engage against respective upper and lower pins 216, 218 of the litter 112 in order to support the litter 112 in a cantilevered position CP during the process of docking the litter 112 to the base 110, as well as to support the litter 112 to the base 110 when operating in the docked mode MD. The docking subassembly 206 also generally includes a forward trolley lock mechanism 220 to inhibit movement of the trolley 210 away from the trolley forward position 210F, and a dock trolley lock mechanism 222 to inhibit movement of the trolley 210 away from the trolley docking position 210D, in order to facilitate transitioning between the undocked mode MU and the docked mode MD as described in greater detail below.

In the illustrated version, the base 110 also includes a stabilizer 224 operatively attached to the foot end FE of the intermediate frame 118 and configured for movement between a retracted configuration 224R (see FIGS. 3F-3G) where the stabilizer 224 is disposed in spaced relation from the floor surface FS, and a deployed configuration 224D (see FIGS. 3A-3E) where the stabilizer 224 engages the floor surface to brace the base 110 at an additional point of contact with the floor surface FS to stabilize the base 110 when the litter 112 is in the cantilevered position CP (see FIG. 3D) during the process of docking the litter 112 to the base 110.

Figure 4B:
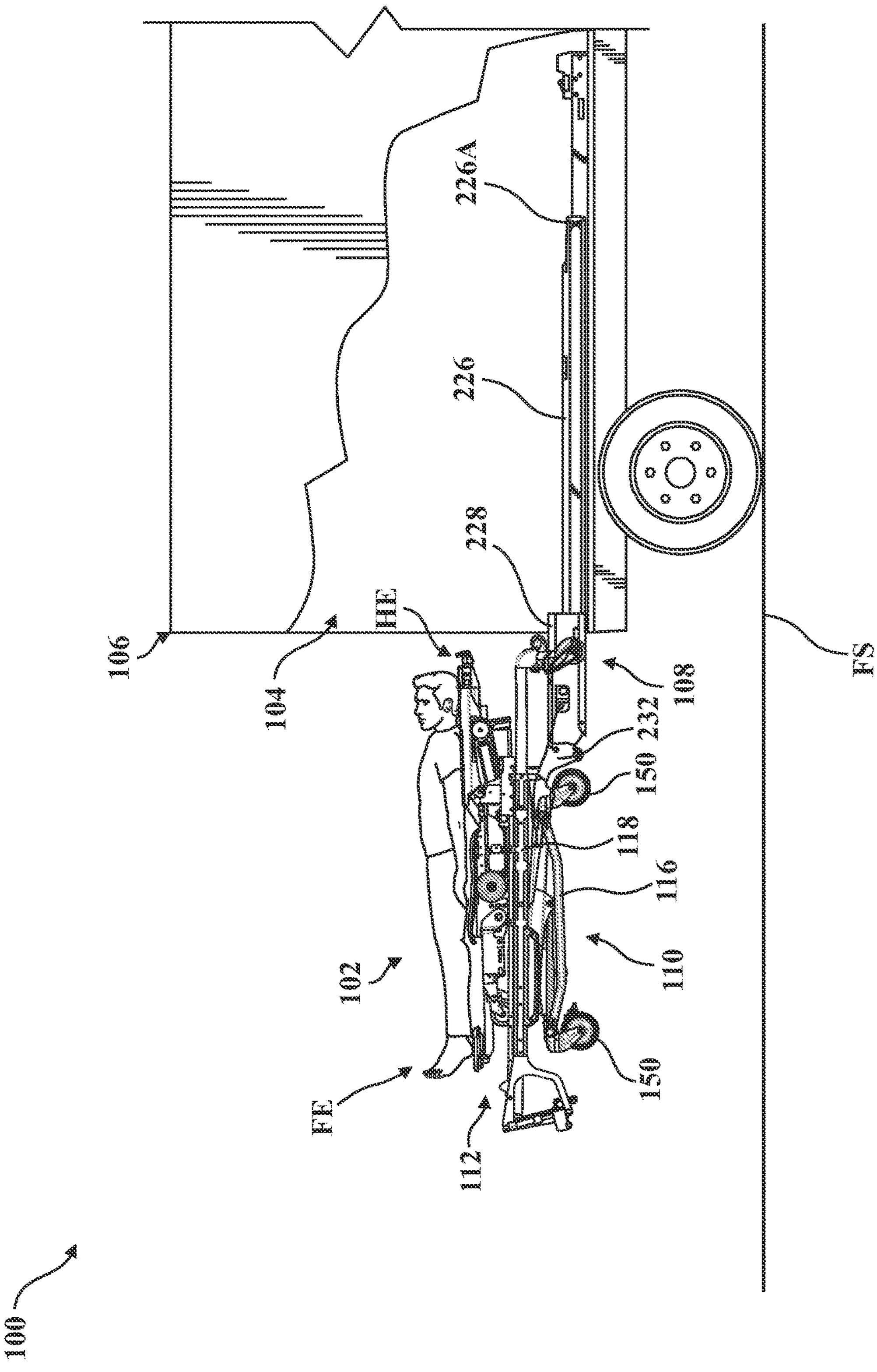
FIG. 4B is another side view of the patient transport apparatus and the ambulance of FIG. 4A, shown with the base arranged in a lowered position secured to the power load device adjacent to the cargo area of the ambulance.
Figure 4C:
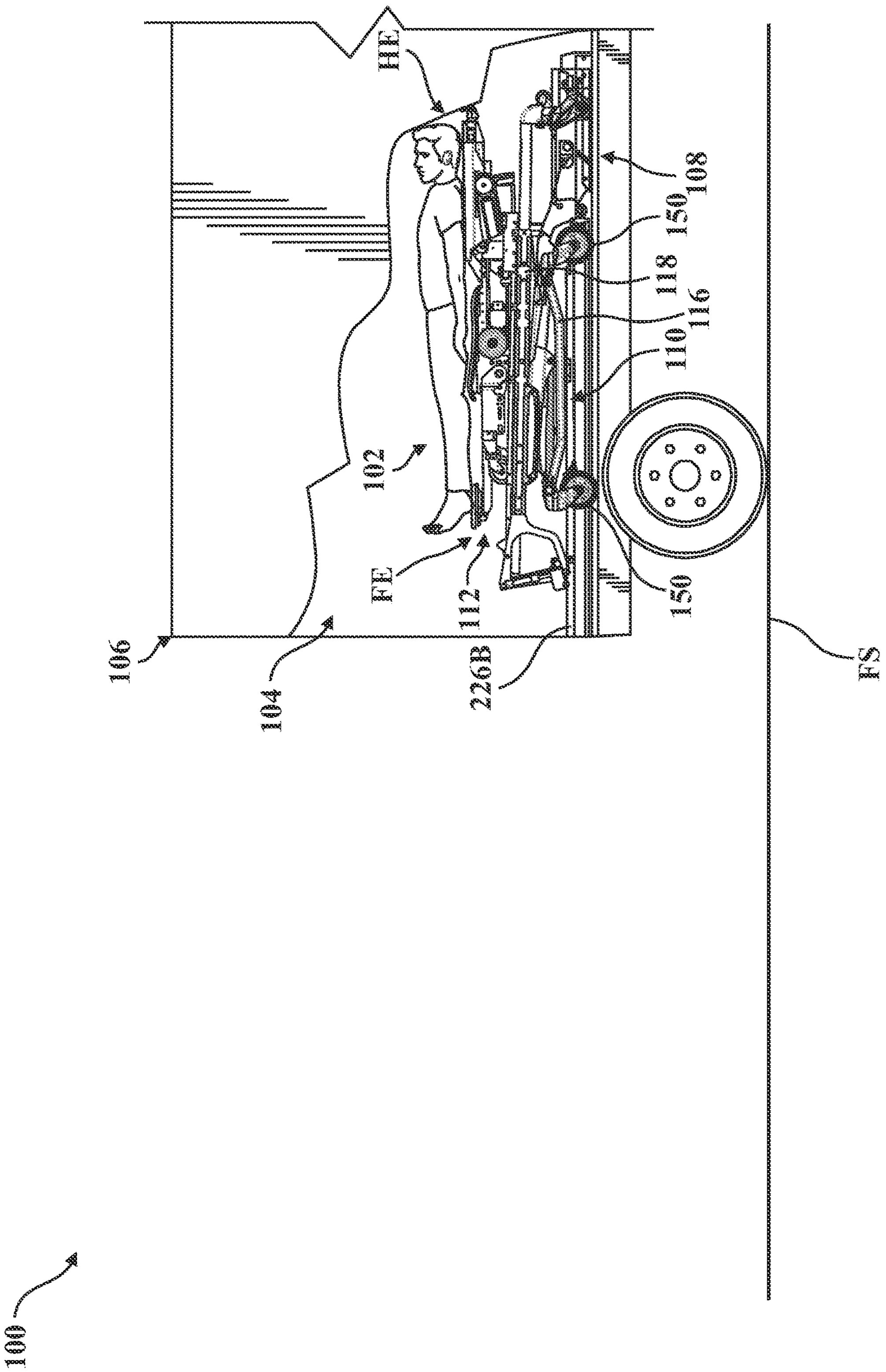
FIG. 4C is another side view of the patient transport apparatus and the ambulance of FIGS. 4A-4B, shown with the power load device retracted together with the patient transport apparatus into the cargo area of the ambulance.

As is shown in FIGS. 4A-4C and depicted schematically in FIG. 2, the power load device 108 is coupled to the ambulance 106 and is configured to load and unload the patient transport apparatus 102 into and out of the ambulance 106 when the power load device 108 is coupled to at least one of the litter 112 and the base 110. In this exemplary version, the power load device 108 of the patient support system 100 is realized as a powered device PD that can be driven by the controller 156 without necessarily forming a part of the patient transport apparatus 102. The power load device 108 generally comprises a rail 226 coupled to the ambulance. The rail 226 comprises a first rail end 226A at the back of the ambulance 106 where patients are loaded (e.g., the cargo area 104), and extends to a second rail end 226B toward the front of the ambulance 106.

The power load device 108 further includes a rail trolley 228 coupled to the rail 226. The rail trolley 228 is movable along a length of the rail 226. The power load device 108 also includes a trolley actuator 230 coupled to the rail 226 and the rail trolley 228 to move the rail trolley 228 along the length of the rail 226, and load arms 232 configured to pivot or otherwise articulate relative to the rail trolley 228 in order to support the patient transport apparatus 102 when at least one of the litter 112 and the base 110 are coupled to the rail trolley 228. The power load device 108 further includes an arm actuator 234 coupled to the rail trolley 228 and the load arms 232 to pivot or otherwise articulate the load arms 232 relative to the rail trolley 228. When the rail trolley 228 is coupled to at least one of the litter 112 and the base 110, the power load device 108 is coupled to or otherwise disposed in communication with the controller 156 to be controlled by the controller 156. The power load device 108 may be powered by a power source supplied by the ambulance 106 and/or by a power source on the patient transport apparatus 102. In some versions, the power load device 108 of the patient support system 100 is configured as described in U.S. Pat. No. 8,439,416, which is hereby incorporated by reference in its entirety.

As noted above, the control system 154 is provided to control operation of the one or more powered devices PD which form a part of or otherwise cooperate with the patient transport apparatus 102. To this end, the controller 156 may employ one or more microprocessors for processing instructions or an algorithm stored in memory to control operation of the one or more powered devices PD. Additionally, or alternatively, the controller 156 may comprise one or more microcontrollers, field programmable gate arrays, systems on a chip, discrete circuitry, and/or other suitable hardware, software, and/or firmware that is capable of carrying out the functions described herein. The controller 156 may be carried on-board the patient transport apparatus 102, or may be remotely located. The controller 156 may comprise one or more subcontrollers configured to control the one or more powered devices PD, and/or one or more subcontrollers for each of the one or more powered devices PD. In some cases, one subcontroller may be attached to the litter 112 and another subcontroller may be attached to the base 110. Power to the one or more powered devices PD and/or the controller 156 may be provided by the energy storage device 168. In alternative configurations, the one or more powered devices PD and/or the controller 156 may be provided by an external power source.

The controller 156 is coupled to the one or more powered devices PD in a manner that allows the controller to control the powered devices PD (e.g., via electrical communication). The controller 156 may communicate with the one or more powered devices PD via wired or wireless connections. In some versions, the controller 156 may generate and transmit control signals to the one or more powered devices PD, or components thereof, to drive or otherwise facilitate operating their associated actuators or to cause the one or more powered devices PD to perform one or more of their respective functions.

In addition to controlling operation of the one or more powered devices PD, in some versions, the controller 156 also determines current and desired states of the litter 112 and/or the base 110 based on input signals that the controller 156 receives from user interfaces 158 and/or based on state signals that the controller 156 receives from the sensing system 160. The state of the litter 112 and/or the base 110 may be a position, a relative position with respect to another object or component, an orientation, a configuration, an angle, a speed, a load condition, an energization status, or any other state of the litter 112 and/or the base 110.

The sensing system 160 comprises a state detection device 236 that is coupled to the litter 112 and the controller 156 and monitors the state of the litter 112 directly, or indirectly. The state detection device 236 comprises one or more sensors S configured to monitor the litter 112, the base 110, and/or the one or more powered devices PD. To this end, the state detection device generates a state signal corresponding to the state of the litter 112 and sends the state signal to the controller, such as when the litter 112 is mounted to the base 110.

The state detection device and/or other aspects of the sensing system 160 may be used by the controller for various purposes. The sensing system 160 may comprise one or more sensors S, including force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. The sensing system 160 may further comprise one or more sensors S to detect mechanical, electrical, and/or electromagnetic coupling between components of the patient transport apparatus 102. Other types of sensors S are also contemplated. Some of the sensors S may monitor thresholds movement relative to discrete reference points. The sensors S can be located anywhere on the patient transport apparatus 102, or remote from the patient transport apparatus 102. For example, the sensors S may be located on or in the patient support surface 114, the base frame 116, the intermediate frame 118, or other suitable locations.

In some configurations, the sensing system 160 may act as an input device used to provide input signals to the controller 156 to cause or continue operation of the one or more powered devices PD. Numerous scenarios exist in which the one or more powered devices PD can be operated based on input signals provided by the sensing system 160 and/or the user interface 158.

In one configuration, the sensing system 160 indicates when the function being performed has been completed by the one or more powered devices PD. By way of non-limiting example, adjustment of one or more powered devices PD may be interrupted or stopped because a minimum or maximum position of the one or more powered devices PD has been reached, such as by using a sensor S realized as a mechanical limit switch, a membrane switch, and the like.

In certain versions, the sensing system 160 may include a state input device 238 to enable a user (e.g., a caregiver) to select a state such that actuation of the state input device 238 generates the state signal. In this case, instead of the controller 156 automatically detecting the current state of the litter 112, a user can manually enter the current state (or, in some versions, a desired state) of the litter 112 (e.g., "litter-on-base," "litter-off-base," etc.). In some configurations, the state input device 238 is spaced from at least one of the user interfaces 158. In other configurations, the state input device 238 is connected to at least one of the user interfaces 158.

One or more user interfaces 158 are coupled to the controller 156 and may be actuated by the user (e.g., a caregiver) to transmit corresponding input signals to the controller 156, and the controller 156 controls operation of the one or more powered devices PD based on the input signals and the state signals. Operation of the one or more powered devices PD may continue until the user discontinues actuation of the user interface 158, (e.g., until the corresponding input signal is terminated). Other configurations are contemplated.

The user interface 158 may comprise devices capable of being actuated by the user, and may be configured to be actuated in a variety of different ways, including but not limited to, mechanical actuation (hand, foot, finger, etc.), hands-free actuation (voice, foot, etc.), and the like. The user interface 158 may comprise one or more of a load cell, a push button, a touch screen, a joystick, a twistable control handle, a dial, a knob, a gesture sensing device for monitoring motion of hands, feet, face, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, buttons/pedals may be physical buttons/pedals, or may be virtually-implemented buttons/pedals such as through optical projection or forming part of a graphical user interface presented on a touchscreen. Buttons/pedals may also be mechanically-implemented in some versions, or may drive-by-wire type buttons/pedals where a user-applied force actuates a sensor S such as a switch or potentiometer. User interfaces 158 may be provided in one or more locations on the base 110 and/or the litter 112. Other configurations are contemplated.

In some versions of the patient transport apparatus 102, the user interface 158 may comprises two buttons B1, B2 that may be actuated to generate the input signal used by the controller 156 to drive the one or more powered devices PD. In other versions, the user interface 158 may comprise three or more buttons. In some versions, the user interface 158 may comprise a single button. Other configurations are contemplated.

As will be appreciated from the subsequent description below, individual buttons B, B (or "input controls") of the user interface 158 may be used to control functions of or associated with more than one powered device PD. The user interfaces 158 generate input signals corresponding to each individual button B1, B2 of the user interface, when actuated. In order to operate different powered devices PD, the input signal received by the controller 156 may not change when the same button B1, B2 is actuated; rather, the state signals generated by the state detection device 236 may change according to the current state of the litter 112 and/or the base 110 such that the controller 156 determines which of the powered devices PD to actuate base **110*d* on the current state detected using the input signal from the same button B1, B2. Put differently, the same button B1, B2 can be used to control different powered devices PD depending on the state determined by the controller 156 via the sensing system 160, the state detection device 236, and/or the state input device 238. By way of non-limiting example, the user may actuate a button B1 on the user interface to operate the base lift device 120 when the litter 112 is in a first state, and the same button B1 may be actuated to operate the track driving device 164 when the litter 112** is in a second state. Other configurations are contemplated.

In one version, the sensing system 160 comprises a load detection device 240 coupled to the base 110. The load detection device 240 is configured to detect when the intermediate frame 118 is subjected to a load, such as load created by the litter 112 or load created by the litter 112 and the patient. More specifically, the load detection device 240 detects when a load has exceeded a load threshold. When the intermediate frame 118 is subject to a load below the load threshold, the base lift actuator 204 raises and lowers the intermediate frame 118 relative to the base frame 116 in response to actuation of the user interface 158 at a first rate. When the intermediate frame 118 is subjected to a load at or above the load threshold, the base lift actuator 204 raises and lowers the intermediate frame 118 relative to the base frame 116 in response to actuation of the user interface 158, at a second rate slower than the first rate. In the illustrated version, the base lift actuator 204 comprises a linear actuator. Here, the state detection device 236 comprises a sensor S to detect the litter 112 being coupled to and supported by the base 110. In this case, the current state of the litter 112 is considered to be a "litter-on-base" state. In response to detection via the sensor S, the state detection device 236 generates a corresponding state signal that is received by the controller 156; here in the "litter-on-base" state, when a user actuates the first button B1 of one of the user interfaces 158, the controller 156 is configured to operate the base lift actuator 204 to raise the litter 112 and the intermediate frame 118 relative to the floor surface and the base frame 116. Conversely, in the "litter-on-base" state, when the user actuates the second button B2 of the user interface 158, the controller 156 is configured to operate the base lift actuator 204 to lower the litter 112 and the intermediate frame 118 relative to the floor surface and the base frame 116. It will be appreciated that the forgoing represents examples of operation of the state detection device 236 and the state input device 238, and that other configurations are contemplated.

Figure 3A:
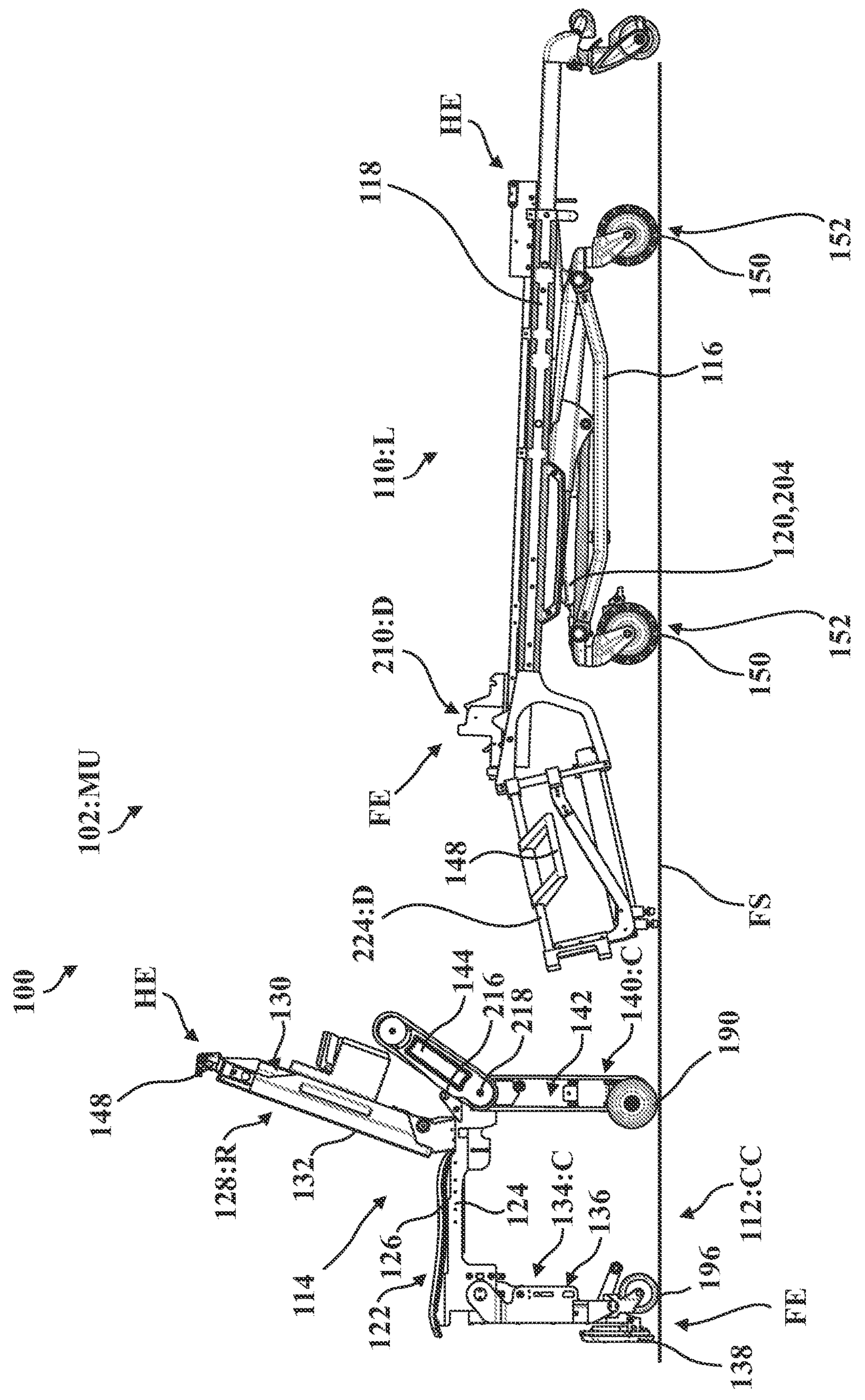
FIG. 3A is a side view of the patient transport apparatus of FIGS. 1A-2, shown with the base arranged in a maximum lowered configuration and having a trolley disposed in a trolley docking position adjacent to the stabilizers shown in the deployed configuration, and with the litter arranged in the stair configuration adjacent to the stabilizers of the base.

As noted above, the litter 112 is operable in the docked mode MD (see FIG. 1B) and in the undocked mode MU (see FIG. 1A). Referring now to FIG. 3A, when in the undocked mode MU, the litter 112 may be disposed adjacent to the base 110, with the litter 112 placed in the chair configuration CC. Here, the chair configuration CC is defined by the fowler assembly 128 being in the fowler raised position 128R, the front assembly 134 being in the front assembly chair position 134C, and with the rear assembly 140 being in the rear assembly chair position 140C. More specifically, here in the chair configuration CC, the fowler raised position 128R places the fowler section 132 relative to the seat section 126 to support the patient in a seated configuration (not shown in detail). Here too, in the chair configuration CC, the front section 138 is arranged to abut the patient's legs, feet, and the like, and the front frame 136 is arranged substantially parallel to the rear frame 142 in a generally vertical configuration with the front wheels 196 and the rear wheels 190 engaging the floor surface FS. Here too in FIG. 3A, the base 110 is shown in the maximum lowered configuration 110L with the stabilizer 224 disposed in the deployed configuration 224D to brace the base 110, and with the litter 112 disposed at the foot end FE of the base 110. In this arrangement, the litter 112 is disposed adjacent to the base 110 and is positioned such as to begin the process of docking.

Figure 3B:
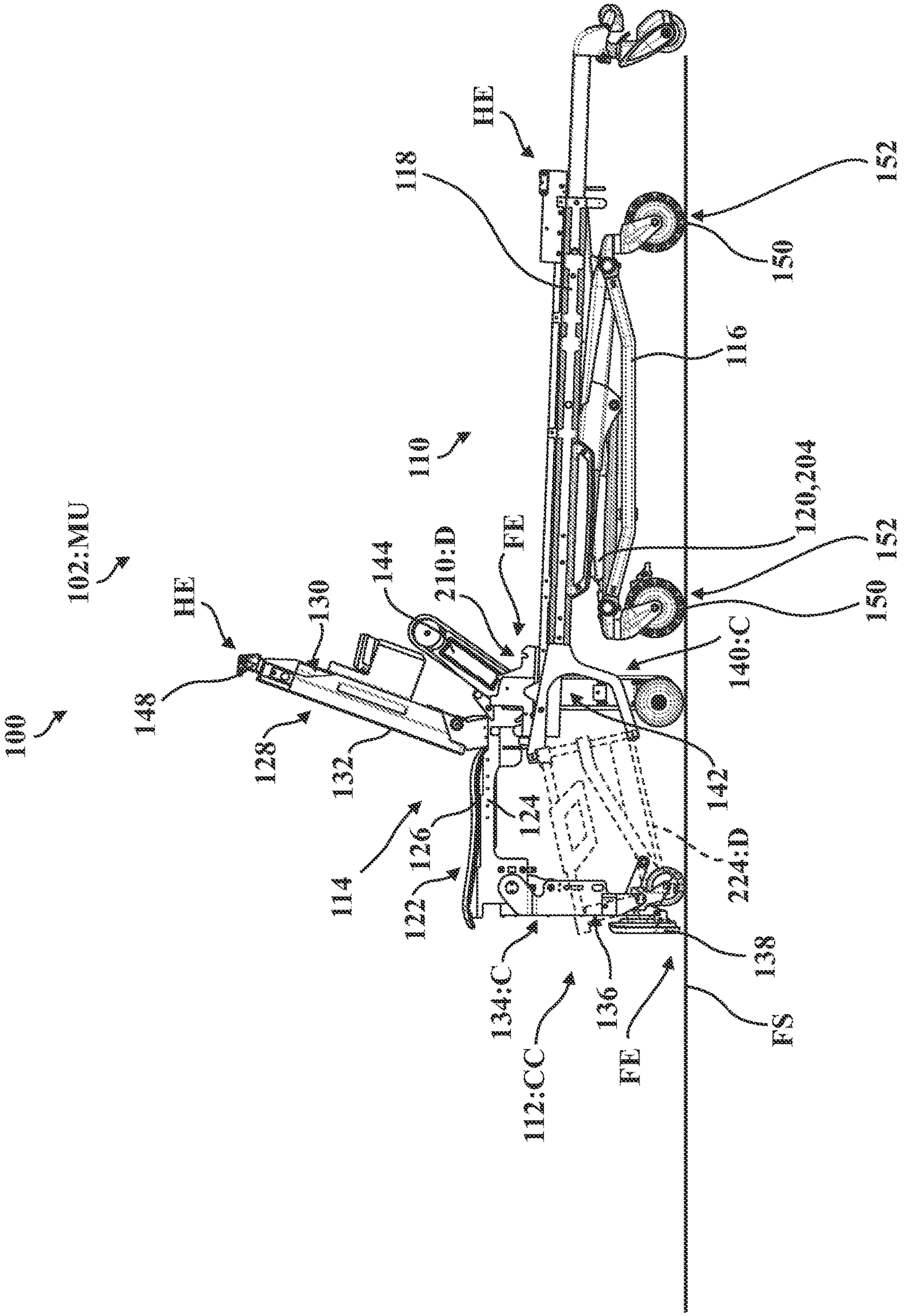
FIG. 3B is another side view of the patient transport apparatus of FIGS. 1A-3A, shown with the litter positioned for engagement with the trolley of the base adjacent to the stabilizers.

Continuing from FIG. 3A to FIG. 3B, the litter 112 is shown having been positioned longitudinally closer to the base 110, bringing the upper and lower pins 216, 218 into proximity of the trolley 210. Here, the sensing system 160 determines the relative positioning of the litter 112, and the controller 156 can be used to begin the process of docking by first actuating the rear actuator 182 to move the rear assembly 140 from the rear assembly chair position 140C towards the rear assembly dock position 140D in order to lower the upper and lower pins 216, 218 into engagement with the upper and lower pin stops 212, 214 of the trolley 210.

Figure 3C:
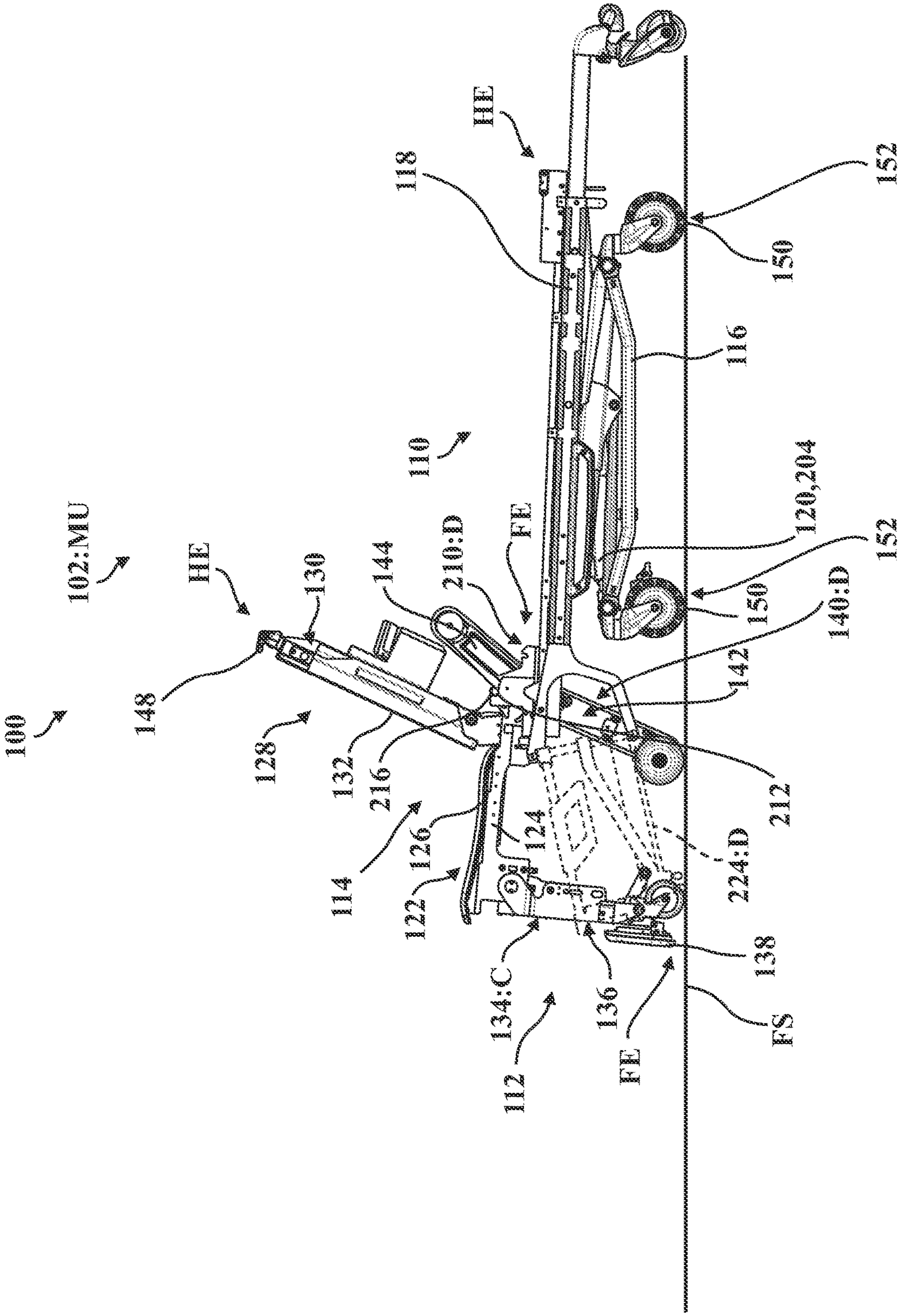
FIG. 3C is another side view of the patient transport apparatus of FIGS. 1A-3B, shown with a rear assembly of the litter pivoting the litter relative to the trolley to transfer weight between the litter and the base.

It will be appreciated that the arrangement of the rear assembly 140 as shown in FIG. 3C is such that the pivoting of the rear assembly 140 about the rear axis XR has moved the rear wheel 190 closer towards the front assembly 134 and has resulted in the seat assembly 122 having "tilted" backwards, which facilitates the process of transferring weight to the base 110. Here too, it will be appreciated that the rear assembly 140 is arranged for movement from the rear assembly chair position 140C (see also FIG. 7C) towards the rear assembly dock position 140D, as well as from the rear assembly chair position 140C towards the rear assembly stair position 140S (see also FIG. 7D) when pivoting about the rear axis XR to move the rear wheel 190 closer towards the front assembly 134. However, the rear assembly 140 is also arranged for movement from the rear assembly chair position 140C (see also FIG. 7C) towards the rear assembly loft position 140L (see FIG. 7A) when pivoting about the rear axis XR to move the rear wheel 190 further away from the front assembly 134.

Figure 3D:
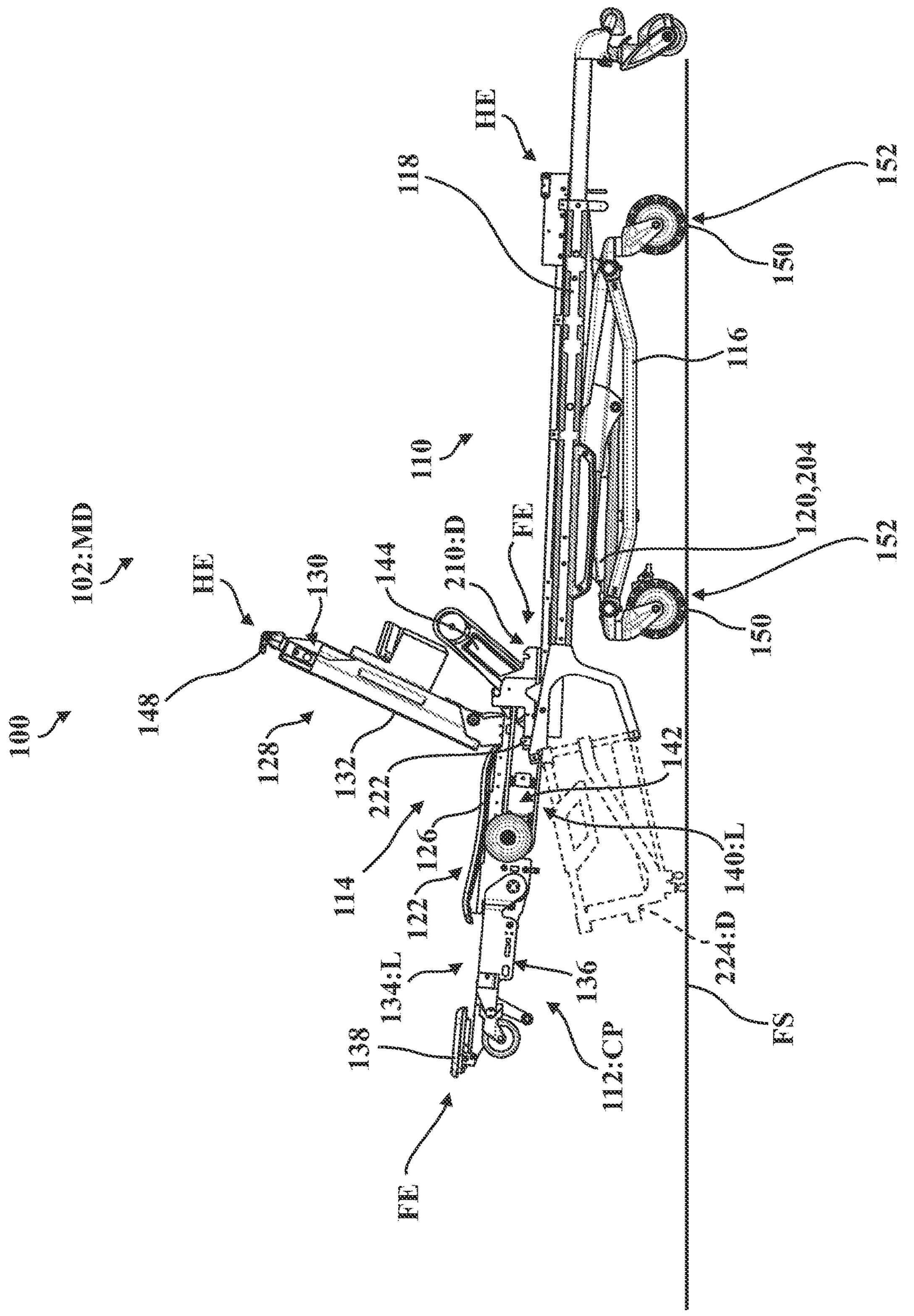
FIG. 3D is another side view of the patient transport apparatus of FIGS. 1A-3C, shown with the litter operating in a cantilevered position where a front assembly and the rear assembly of the litter are pivoted off of the floor surface to transfer weight from the litter onto the base, the base shown braced via the stabilizers.

With continued reference to FIG. 3C, once the controller 156 has determined that the lower the upper and lower pins 216, 218 have come into engagement with the upper and lower pin stops 212, 214 of the trolley 210, the controller 156 drives the rear actuator 182 to pivot the rear assembly 140 about the rear axis XR until it reaches the a rear assembly dock position 140D and, at the same time, drives the front actuator 180 to pivot the front assembly 134 about the front axis XF from the front assembly chair position 134C to the front assembly loft position 134L as shown in FIG. 3D. Here, it will be appreciated that the rear actuator 182 and the front actuator 180 may be driven simultaneously by the controller 156.

Figure 3E:
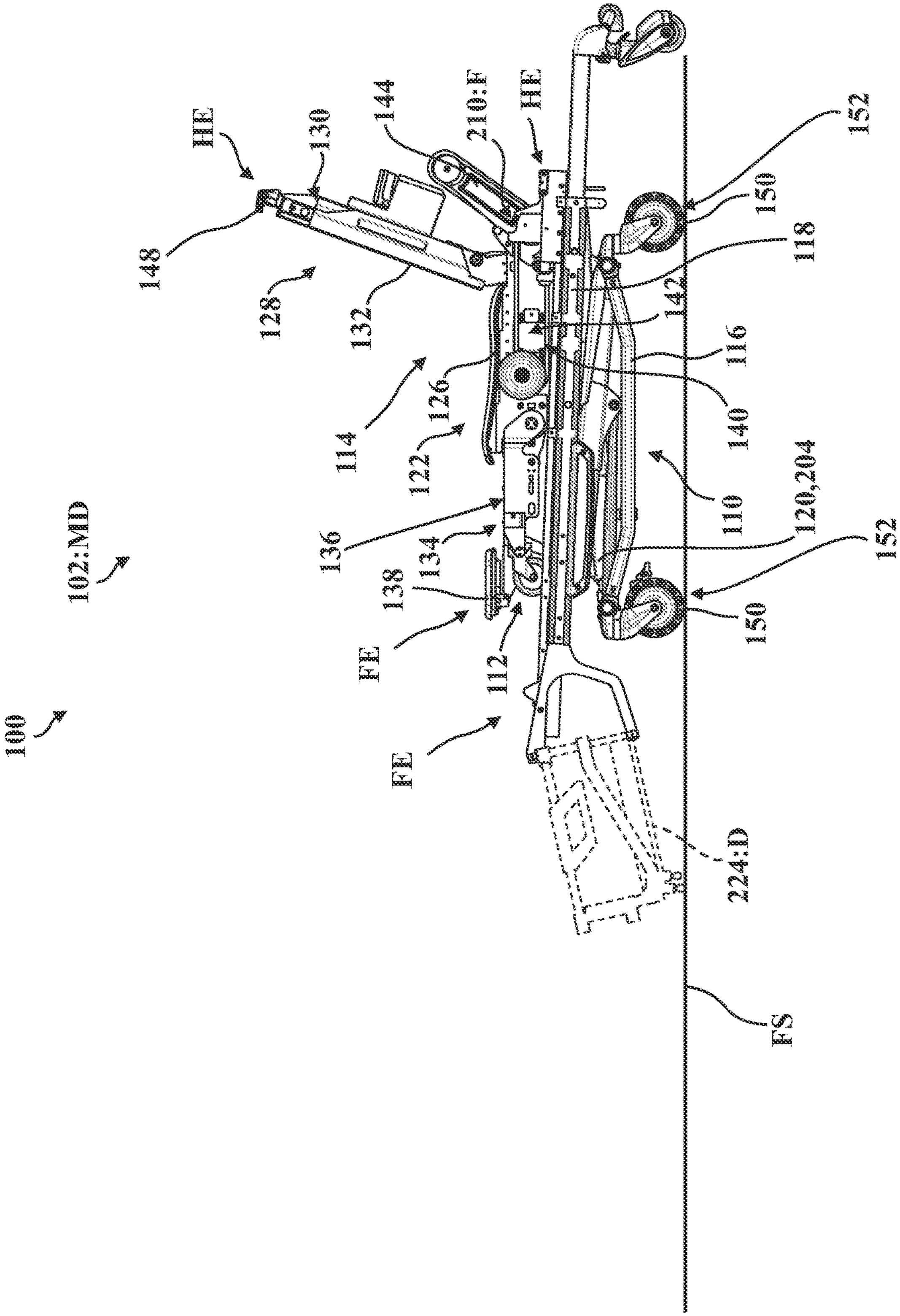
FIG. 3E is another side view of the patient transport apparatus of FIGS. 1A-3D, shown with the litter having moved with the trolley to a trolley forward position to place the patient transport apparatus in the docked mode MD.
Figure 3F:
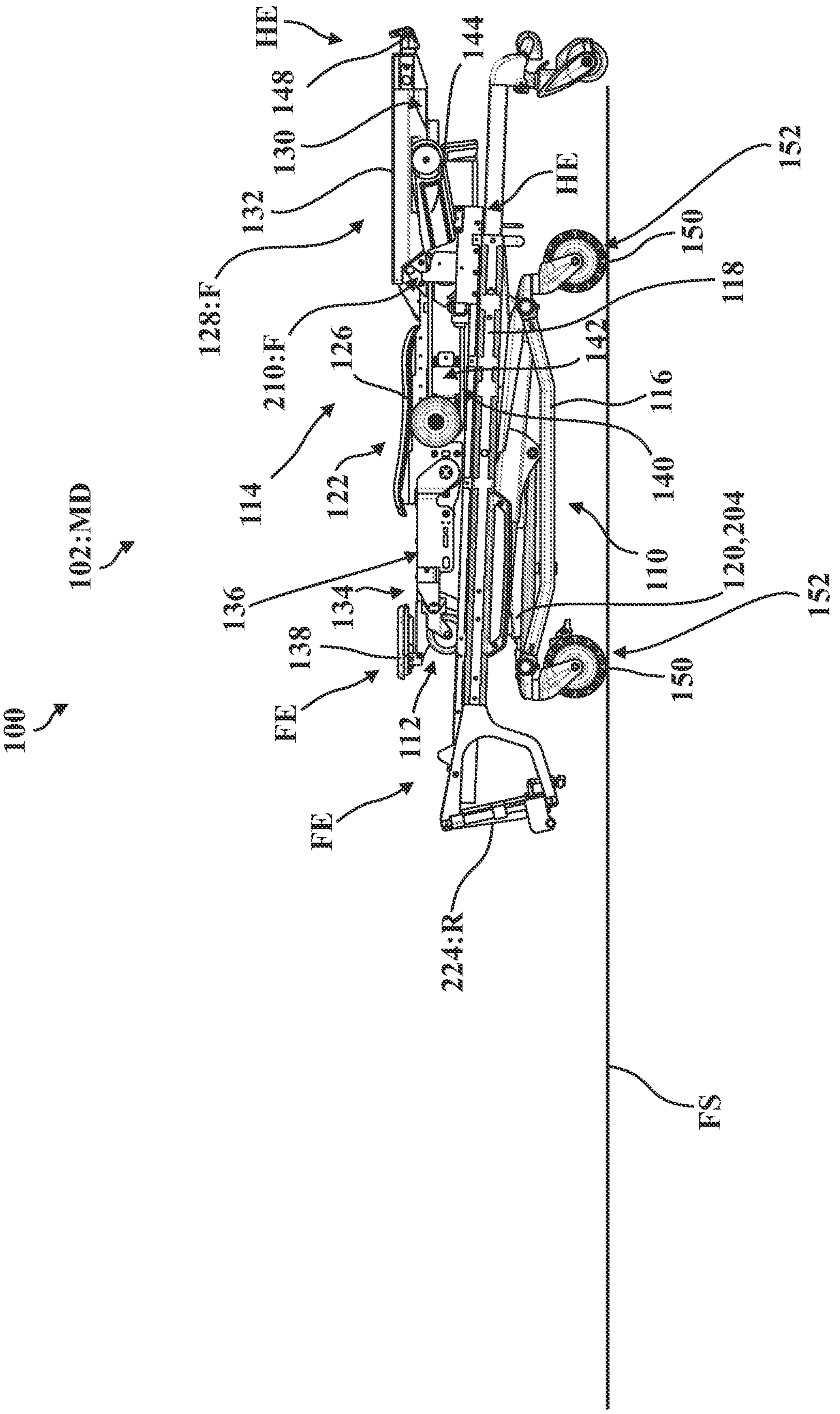
FIG. 3F is another side view of the patient transport apparatus of FIGS. 1A-3E, shown operating in the docked mode, with the stabilizers moved to the retracted configuration, and with a fowler assembly of the litter 112 shown arranged in a fowler lowered position.
Figure 3G:
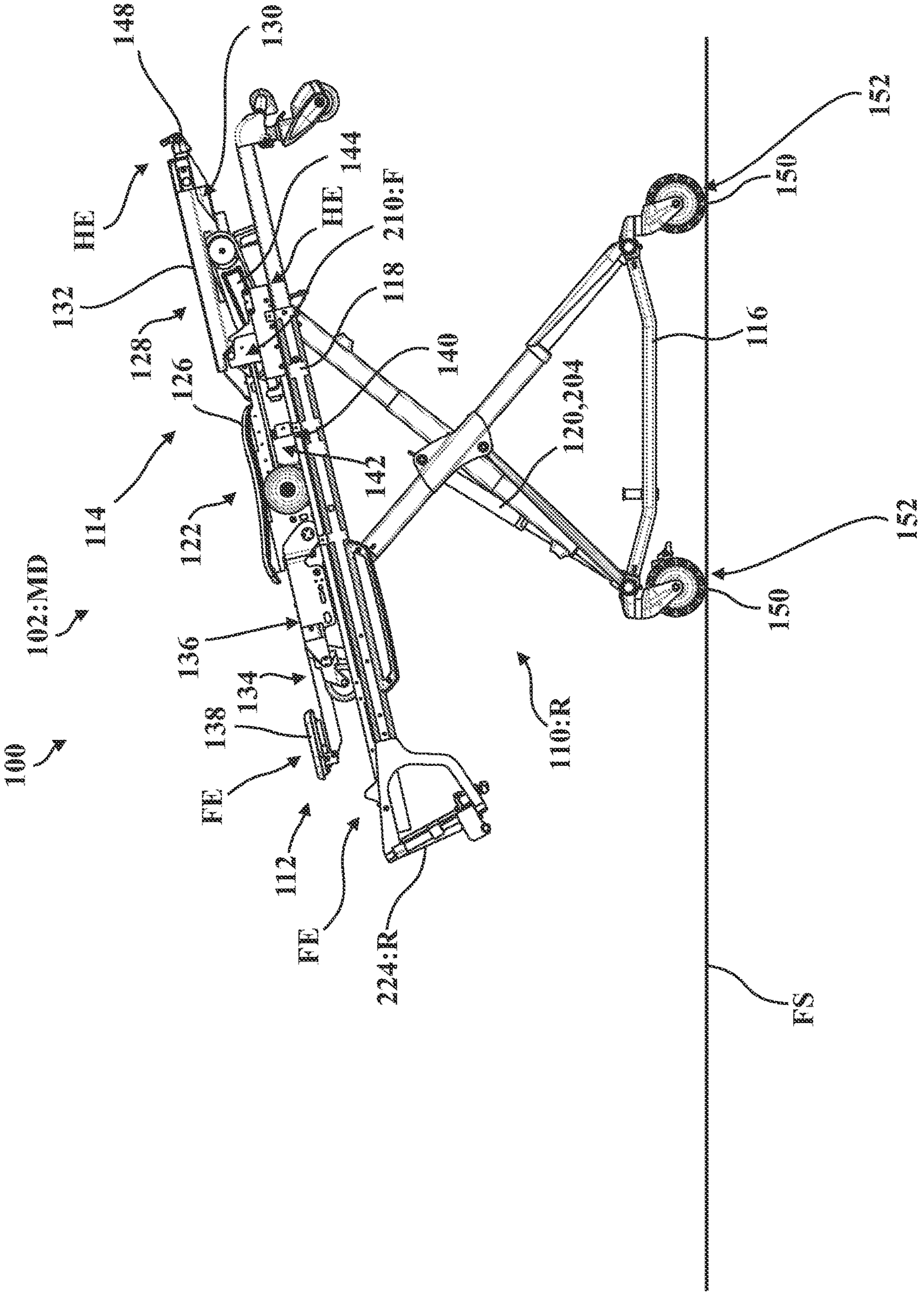
FIG. 3G is another side view of the patient transport apparatus of FIGS. 1A-3F, shown operating in the docked mode, with the base arranged in a raised configuration.

In FIG. 3D, the litter 112 is shown disposed in the cantilevered position CP with the trolley 210 disposed in the trolley docking position 210D arranged at the foot end FE of the base 110. Here, the front assembly 134 and the rear assembly 140 are arranged generally parallel to each other and to the seat assembly 122. From this cantilevered position CP depicted in FIG. 3D, the dock trolley lock mechanism 222 can be disengaged by the user, and the trolley 210 can be moved to the trolley forward position 210F arranged at the head end HE of the base 110, as shown in FIG. 3E. Here, in FIG. 3E, the dock trolley lock mechanism 222 retains the trolley 210 in the trolley forward position 210F which places the patient transport apparatus 102 in the docked mode MD. At this point, the stabilizer can be moved to the retracted configuration 224R out of contact with the floor surface FS, and other portions of the patient transport apparatus 102 may be moved if needed, such as to move the fowler assembly 128 to the fowler lowered position 128L as shown in FIG. 3F and/or to raise the intermediate frame 118 to position the base 110 in the maximum raised configuration 110R as shown in FIG. 3G.

FIG. 4A shows the patient transport apparatus 102 in the docked mode MD and positioned adjacent to the cargo area 104 of the ambulance 106 for loading via the power load device 108. Here, the base 110 is arranged with the intermediate frame 118 raised relative to the base frame 116 near or slightly below the maximum raised configuration 110R in order to facilitate loading the patient transport apparatus 102 into the ambulance 106. Continuing to FIG. 4B from FIG. 4A, the patient transport apparatus 102 has been loaded onto the power load device 108 at the first rail end 226A of the rail 226. Here too in FIG. 4B, the base lift device 120 of the base 110 has been utilized to position the base 110 in the maximum lowered configuration 110L, which results in the base wheels 150 coming out of contact with the floor surface FS after weight from the patient transport apparatus 102 has been transferred to the power load device 108 via the load arms 232. At this point, the rail trolley 228 may be moved towards the second rail end 226B of the rail 226 as shown in FIG. 4C in order to load the patient transport apparatus 102 fully into the cargo area 104 of the ambulance 106.

Referring now to FIGS. 5-8, when operating in the undocked mode MU, the litter 112 can be placed in a number of different configurations to support the patient for movement independent of the base 110. In FIG. 7A, for example, the litter 112 is arranged in the loft configuration CL with the rear assembly 140, the front assembly 134, and the fowler assembly 128 each arranged generally parallel to the seat assembly 122 to support the patient in a flat configuration (e.g., laying down). Here in the loft configuration CL, the rear assembly 140 is in the rear assembly loft position 140L, the front assembly 134 is in the front assembly loft position 134L, the fowler assembly 128 is in the fowler lowered position 128L, and the ski assembly is in the lowered ski position 144L. From this position, the litter 112 can be moved into the chair configuration CC depicted in FIG. 7C by moving the front assembly 134 to the front assembly chair position 134C while also moving the rear assembly 140 to the rear assembly chair position 140C and the fowler assembly 128 to the fowler raised position 128R. Here, it will be appreciated that FIG. 7B depicts intermediate positions of the front assembly 134, the rear assembly 140, and the fowler assembly.

Figure 5:
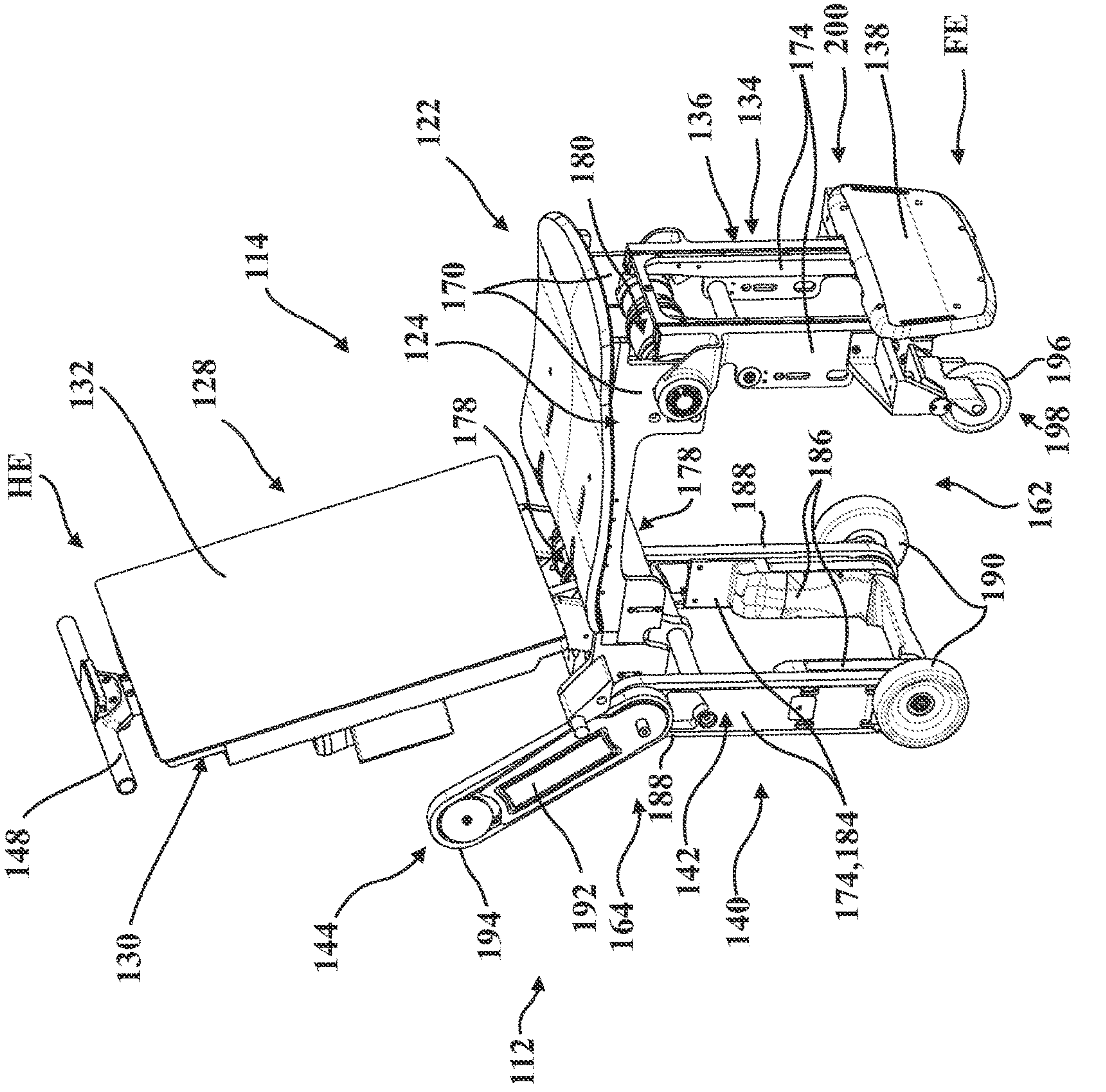
FIG. 5 is a front perspective view of the litter of the patient transport apparatus of FIGS. 1A-4C.
Figure 6:
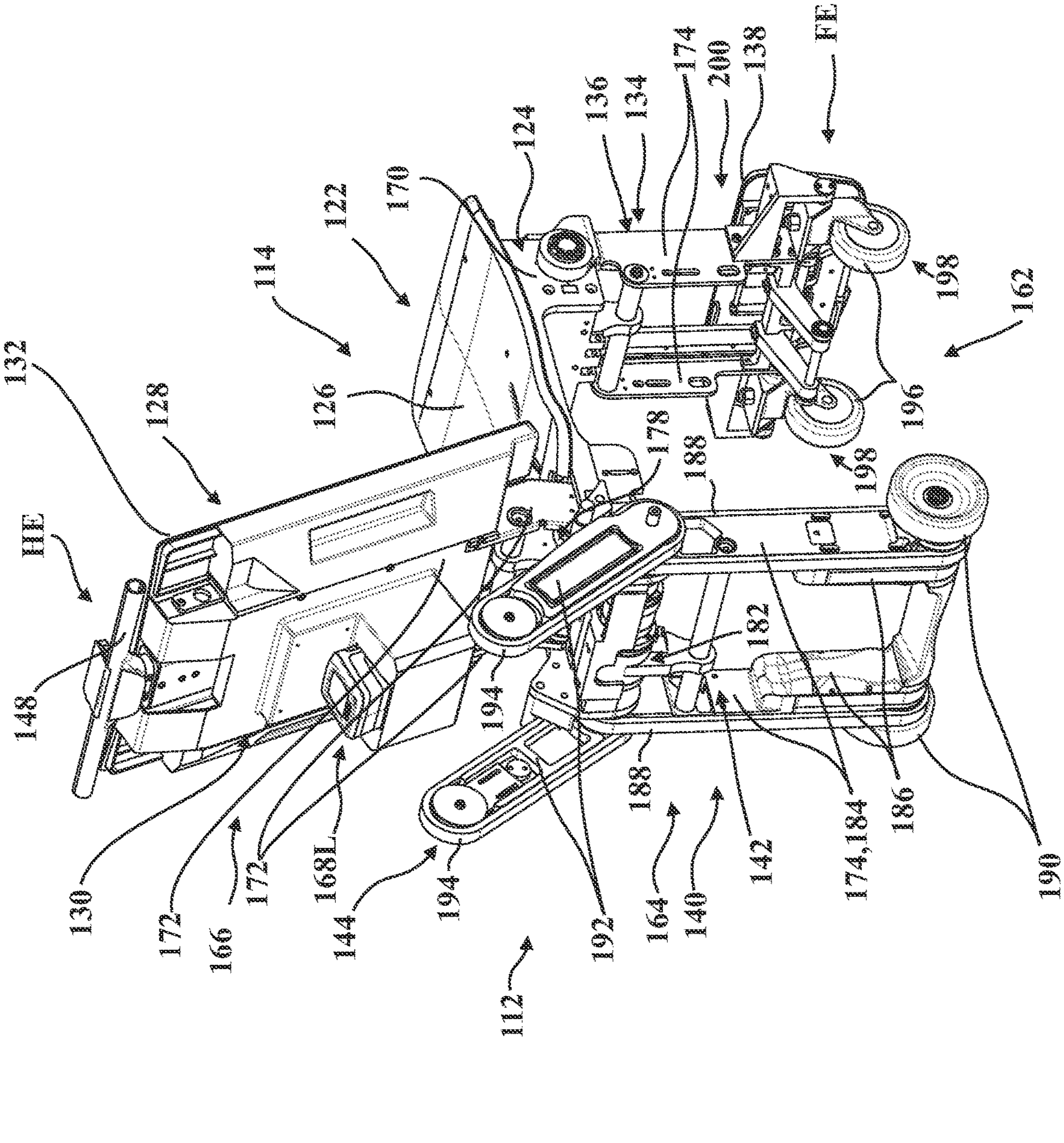
FIG. 6 is a rear perspective view of the litter of the patient transport apparatus of FIGS. 1A-5.

In the chair configuration CC depicted in FIGS. 5-6 and 7C, the rear assembly 140 and the front assembly 134 are each arranged parallel to each other and generally perpendicular to the seat assembly 122. From the chair configuration CC, the rear assembly 140 and the front assembly 134 can be moved simultaneously to bring the litter 112 into the stair configuration CS as depicted in FIG. 7D by placing the rear assembly 140 in the rear assembly stair position 140S and by placing the front assembly 134 in the front assembly stair position 134S. Here too in the stair configuration CS depicted in FIG. 7D, the front assembly 134 and the rear assembly 140 are arranged substantially parallel to each other, but are now arranged an oblique angle relative to the seat assembly 122 in order to, among other things, position the leg tracks 188 for engagement with stairs ST as shown in FIG. 8. Here in the stair configuration CS, the track driving device 164 can be used to move the litter 112 along stairs ST via engagement with the leg tracks 188 (as well as the ski tracks 194). It will be appreciated that the litter 112 can be moved between the configurations CL, CC. CS in various ways to facilitate patient care, and can be docked to and/or undocked from the base 110 as noted above.

Referring to FIGS. 9A-18B, as noted above, the intermediate frame 118 may include intermediate rails 208 which support the trolley 210 for translation between the trolley forward position 210F and the trolley docking position 210D. The intermediate rails 208 may be arranged such that they extend between the foot end FE of the intermediate frame 118 and the head end HE of the intermediate frame. In the illustrated versions, the intermediate frame 118 also includes an auxiliary guide 340 to facilitate engaging and securing the litter 112 to the base 110. To this end, and as is best shown in FIGS. 9A-14B, the auxiliary guide 340 is arranged below and spaced laterally inwardly from the intermediate rails 208 to receive and cooperate with an auxiliary roller assembly 342 of the litter 112. The auxiliary roller assembly 342 is operatively attached to the front assembly 134 of the litter 112 in the illustrated versions. While not shown in detail, the auxiliary roller assembly 342 may be movable relative to the front assembly 134 or other portions of the litter 112 in some versions. By way of non-limiting example, the auxiliary roller assembly 342 may pivot in-line with the front frame 136 when the litter 112 operates in the chair configuration CC, and may deploy away from the front frame 136 when the litter 112 moves into the cantilevered position CP so as to position the auxiliary roller assembly 342 for engagement with the auxiliary guide 340. To this end, in the illustrated versions, the auxiliary roller assembly 342 includes an auxiliary frame 344 extending from the front assembly 134 of the litter 112, and one or more auxiliary rollers 346 extending from the auxiliary frame 344. As will be appreciated from the subsequent description below, the engagement between the auxiliary roller assembly 342 and the auxiliary guide 340 to provides an auxiliary point of contact to support the litter 112 when the litter 112 is docked to the trolley 210 and the trolley 210 is in the trolley forward position 210F.

With continued reference to FIGS. 9A-18B, the auxiliary guide 340 defines an auxiliary channel 348 extending from a first guide end 350, arranged adjacent to the foot end FE of the intermediate frame 118, toward the head end HE of the intermediate frame 118 to a second guide end 352. The first guide end 350 defines a first guide inlet 354 configured to receive the auxiliary roller 346 of the auxiliary roller assembly 342. The auxiliary channel 348 may be any suitable shape to accommodate the auxiliary roller 346 of the auxiliary roller assembly 342. For example, the auxiliary channel 348 may define a C-shaped channel. Other configurations are contemplated.

Referring to FIGS. 10A-12B, the auxiliary roller assembly 342 may be arranged to engage the guide inlet 354 as the litter 112 translates from the cantilevered position CP to the litter forward position 112F. The auxiliary roller assembly 342 may be configured to moveably engage the auxiliary guide 340 such that the auxiliary roller 346 of the auxiliary roller assembly 342 rolls along the auxiliary channel 348 of the auxiliary guide 340. For example, the auxiliary roller assembly 342 may be configured to translate along the auxiliary channel 348 between a first roller position 356 where the auxiliary roller assembly 342 is aligned with the first guide end 350, and a second roller position 358 where the auxiliary roller assembly 342 is aligned with the second guide end 352. It will be appreciated that the C-shaped profile of the auxiliary channel 348 serves to constrain the vertical movement of the auxiliary roller assembly 342. For example, if the auxiliary roller assembly 342 exerts or otherwise experiences downward forces, a bottom lip 360 of the C-shaped auxiliary channel 348 provides an auxiliary point of contact to support the litter 112. Conversely, if the auxiliary roller assembly 342 exerts or otherwise experiences upward forces, a top lip 362 of the C-Shaped auxiliary channel 348 constrains the auxiliary roller assembly 342 from lifting out of the auxiliary channel 348.

Figure 10A:
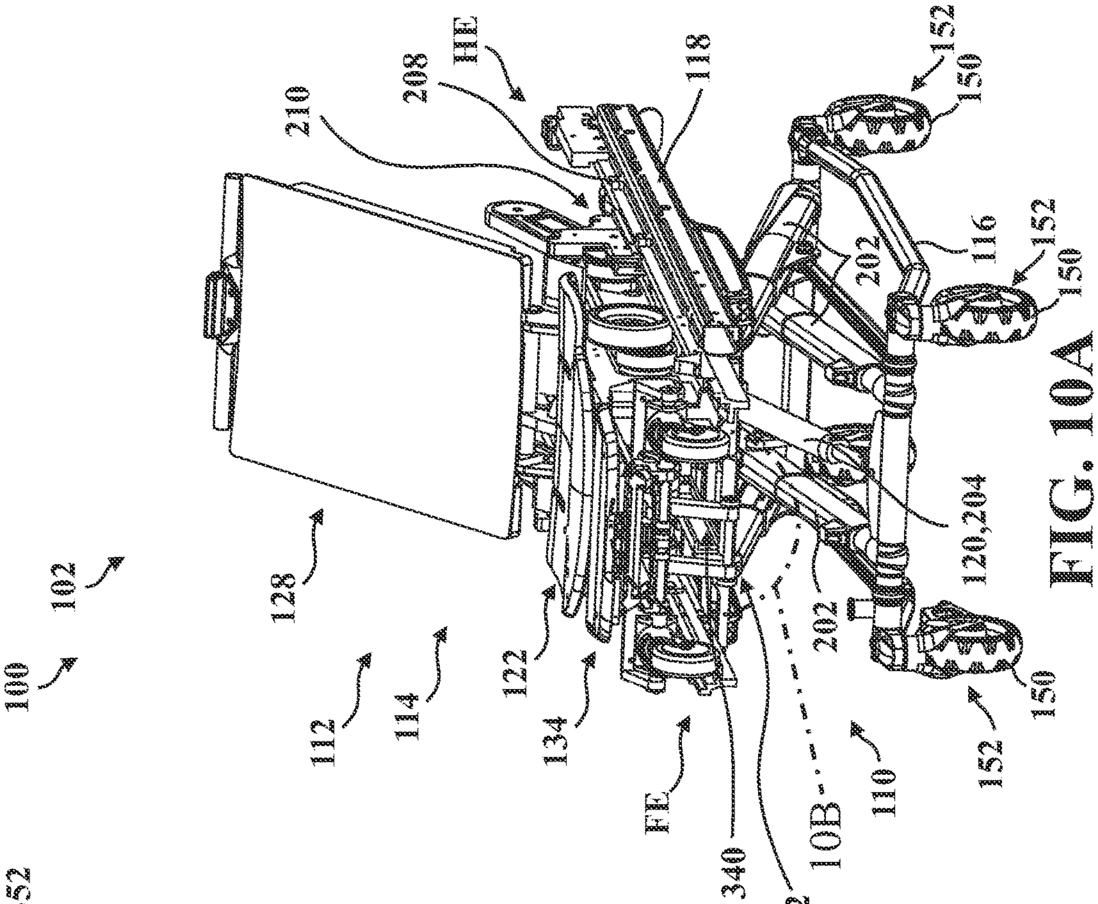
FIG. 10A is a front perspective view of portions of the patient transport apparatus of FIGS. 1A-4C, depicting the litter secured to the base while transitioning between the undocked mode and the docked mode, the litter shown having an auxiliary roller assembly aligned with the auxiliary guide of the base, with the base shown raised from the maximum lowered configuration for illustrative purposes.
Figure 10B:
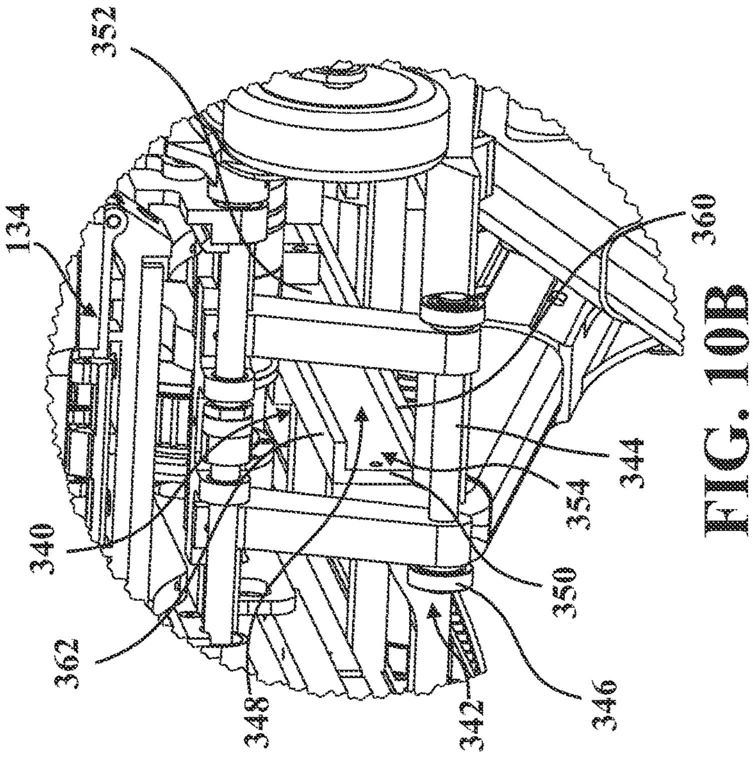
FIG. 10B is an enlarged partial perspective view taken at indicia 10B in FIG. 10A.
Figure 11A:
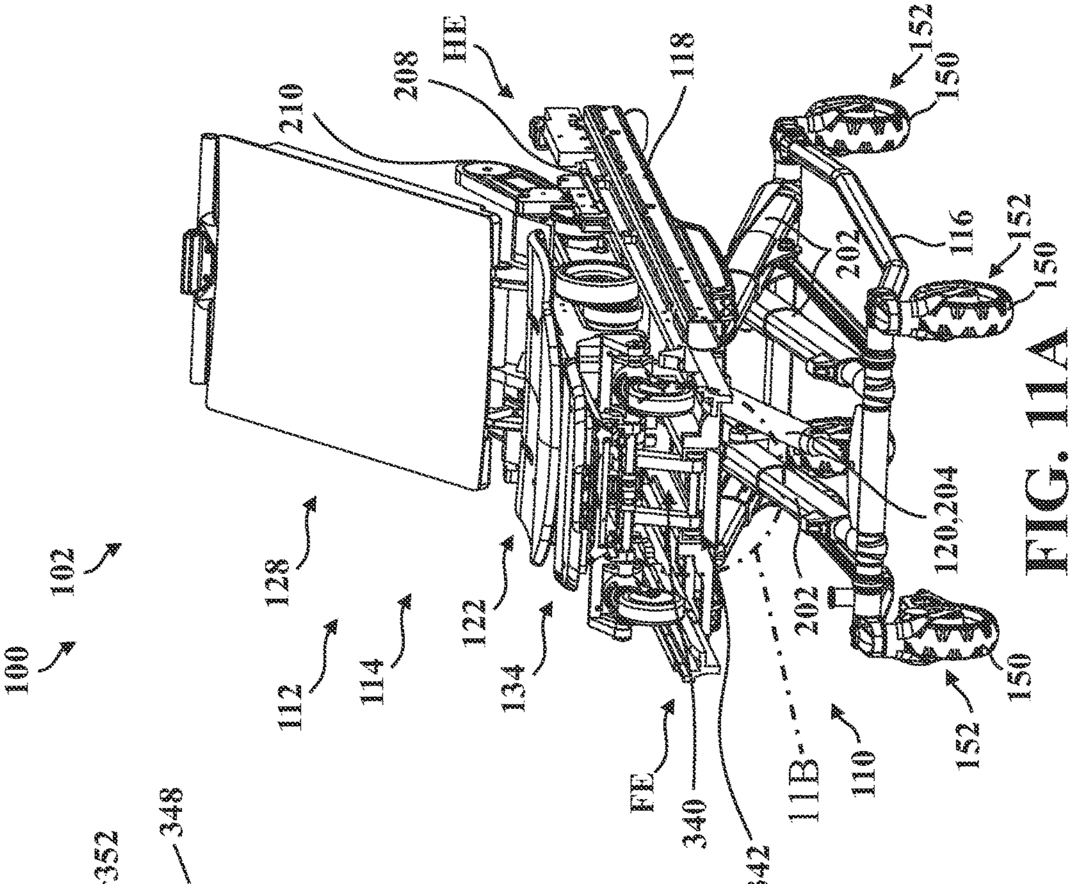
FIG. 11A is another front perspective view of the portions of the patient transport apparatus of FIG. 10A, depicting the litter secured to the base while transitioning between the undocked mode and the docked mode, shown with the auxiliary roller assembly of the litter engaging the auxiliary guide of the base, and shown with the base raised from the maximum lowered configuration for illustrative purposes.
Figure 11B:
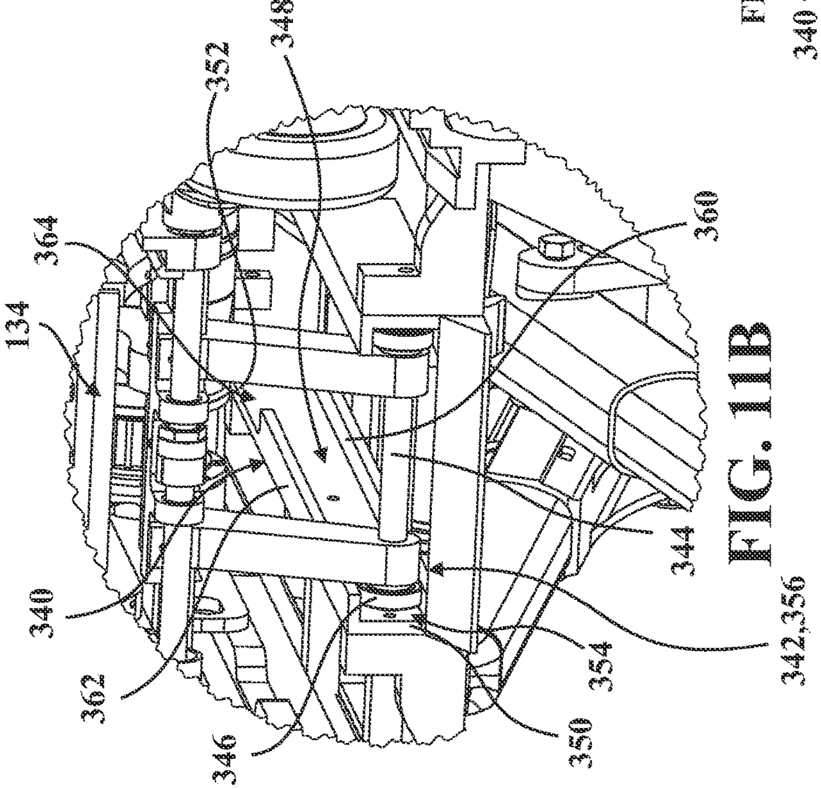
FIG. 11B is an enlarged partial perspective view taken at indicia 11B in FIG. 11A.
Figure 12A:
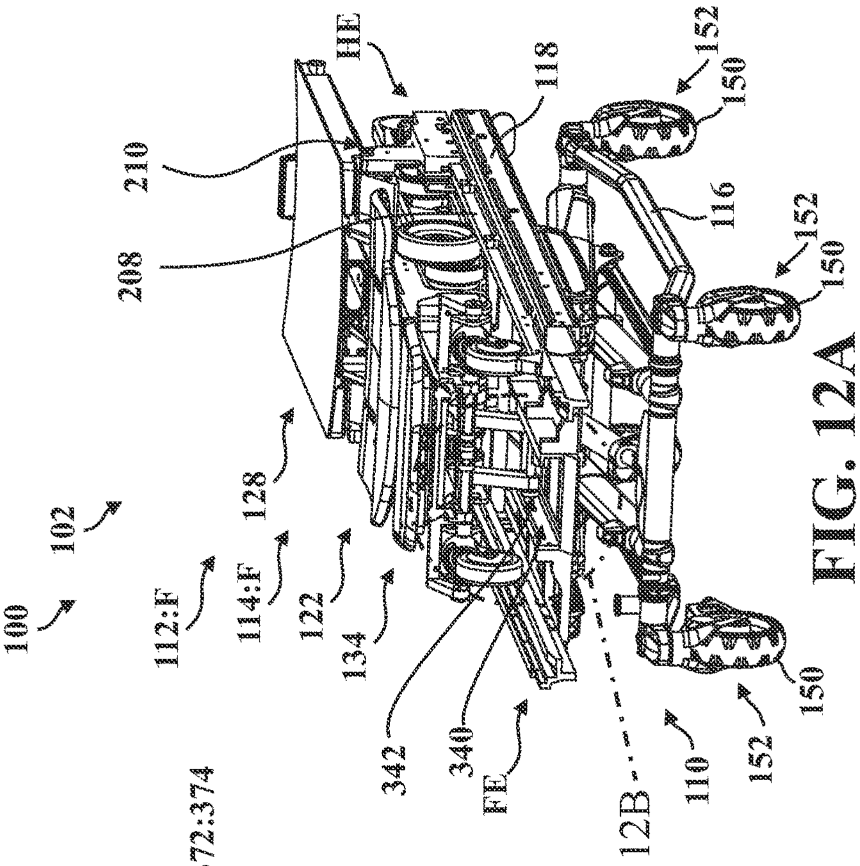
FIG. 12A is another front perspective view of the portions of the patient transport apparatus of FIGS. 10A-11A, depicting the litter secured to the base in the docked mode, shown with the auxiliary roller assembly of the litter engaging the auxiliary guide of the base, and shown with the base raised from the maximum lowered configuration for illustrative purposes.
Figure 12B:
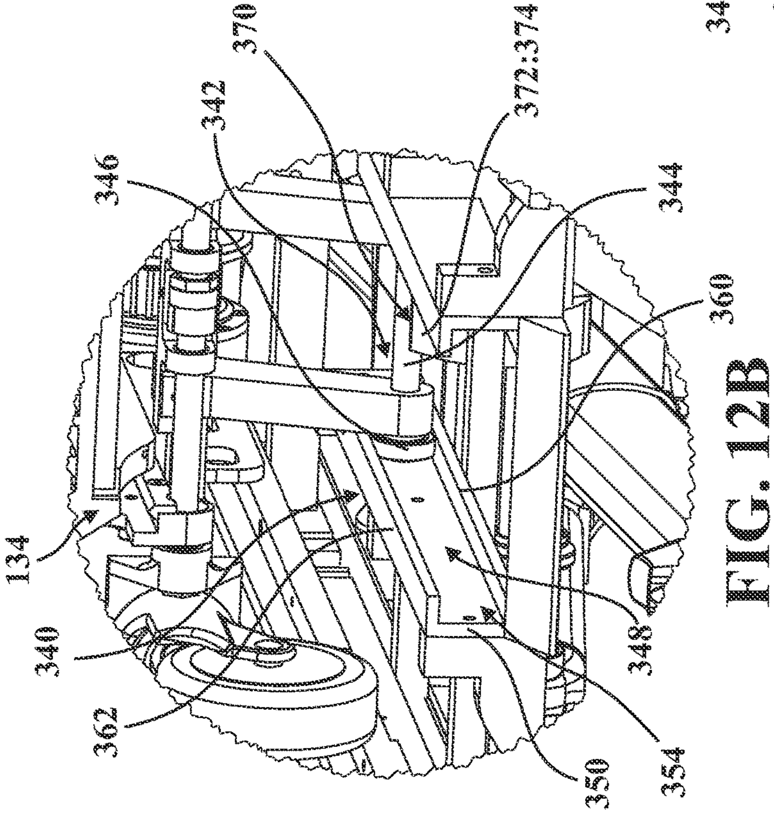
FIG. 12B is an enlarged partial perspective view taken at indicia 12B in FIG. 12A.

FIGS. 10A-12B illustrate the sequence of the litter 112 moving from the cantilevered position CP to the litter forward position 112F. In FIGS. 10A-10B, the auxiliary roller 346 of the auxiliary roller assembly 342 is shown aligned with the guide inlet 354 as the litter 112 translates from the cantilevered position CP toward the litter forward position 112F. Next, FIGS. 11A-11B show the auxiliary roller assembly 342 engaging the guide inlet 354 such that the auxiliary roller 346 of the auxiliary roller assembly 342 is engaged within the auxiliary channel 348 as the litter 112 continues to translate from the cantilevered position CP toward the litter forward position 112F. Further, FIGS. 12A-12B show the trolley 210 in the trolley forward position such that that litter 112 is in the litter forward position 112F. FIGS. 12A-12B also show the patient support surface 114 arranged in a flat configuration 114F where at least the front assembly 134 and the seat assembly 122 are substantially parallel to the intermediate frame 118. Here in the configuration shown in FIGS. 12A-12B, the auxiliary roller 346 of the auxiliary roller assembly 342 remains within the C-shaped auxiliary channel 348 such that movement of the auxiliary roller assembly 342 remains vertically constrained.

Figure 13A:
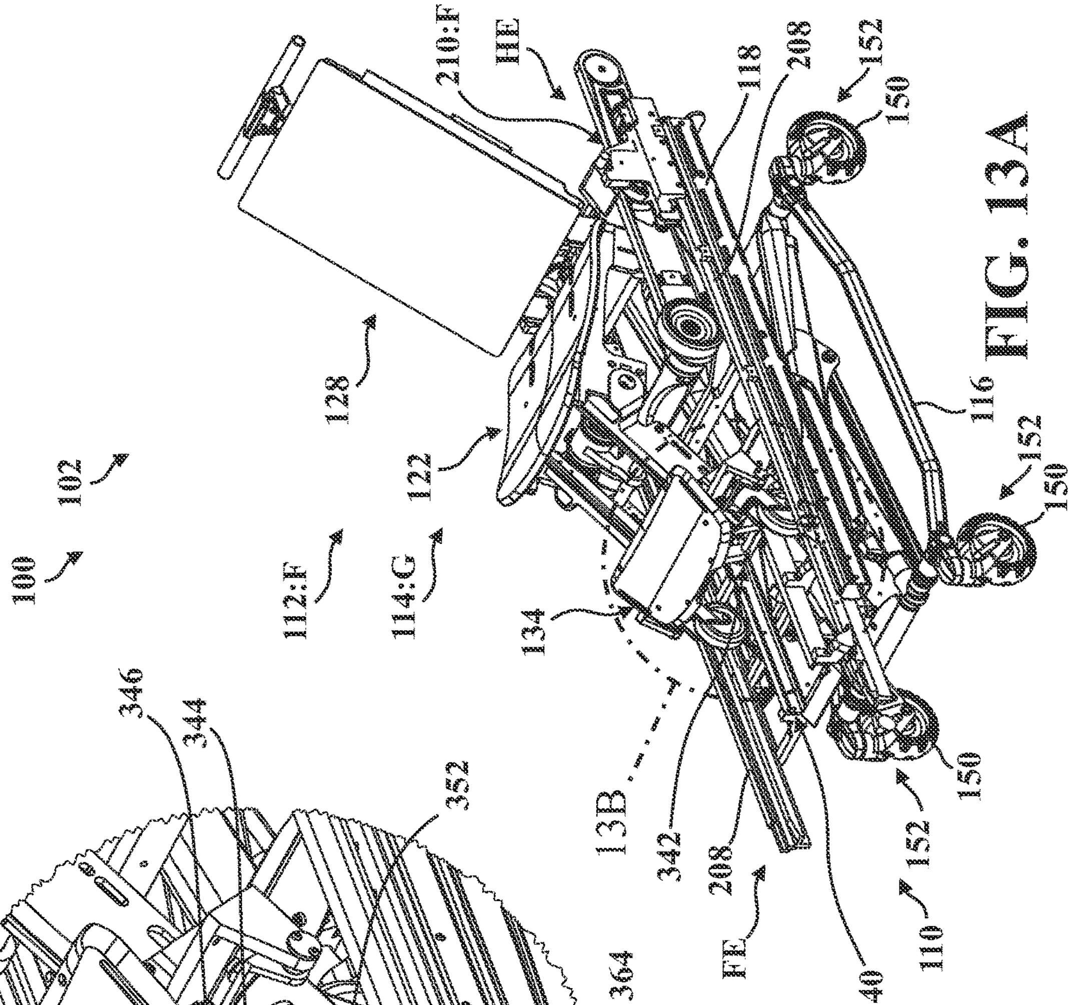
FIG. 13A is another front perspective view of the portions of the patient transport apparatus of FIGS. 10A-12A, depicting the litter secured to the base in the docked mode and arranged in a gatch configuration, and shown with the auxiliary roller assembly of the litter engaging the auxiliary guide of the base.
Figure 13B:
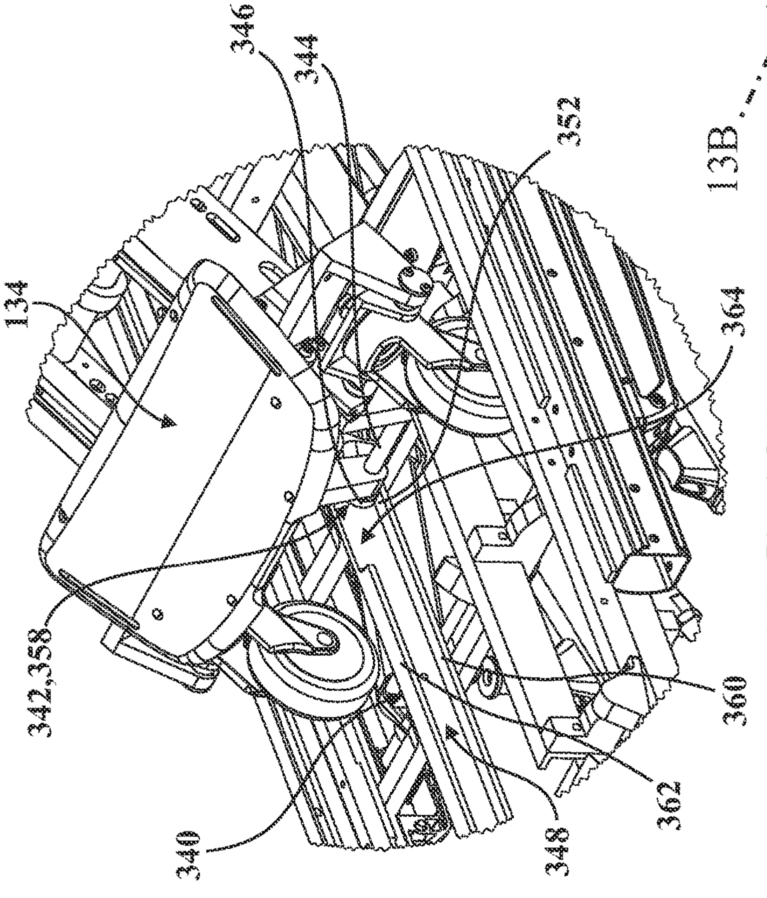
FIG. 13B is an enlarged partial perspective view taken at indicia 13B in FIG. 13A.
Figure 14A:
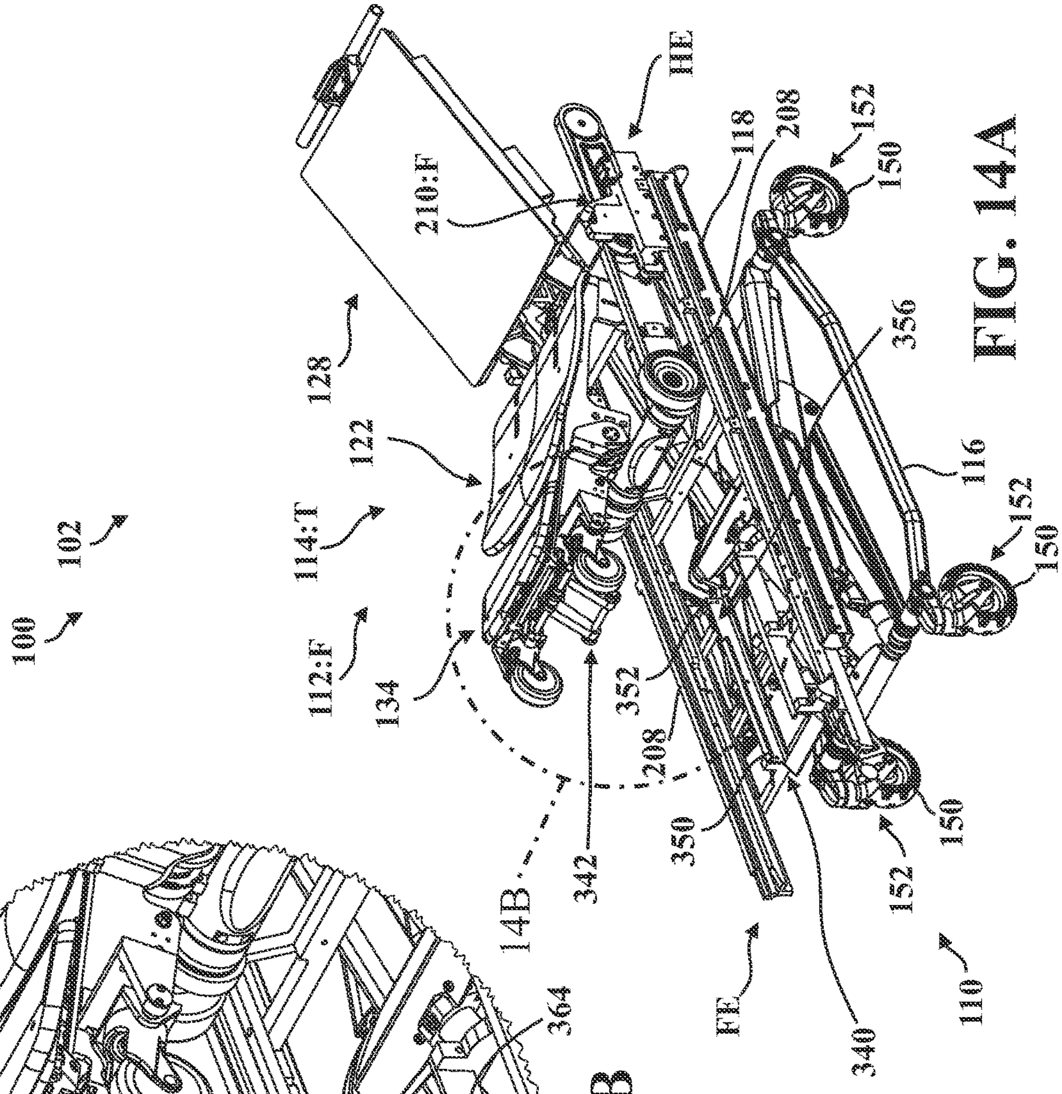
FIG. 14A is another front perspective view of the portions of the patient transport apparatus of FIGS. 10A-13A, depicting the litter secured to the base in the docked mode and arranged in a trend configuration, and shown with the auxiliary roller assembly of the litter disengaged from the auxiliary guide of the base.
Figure 14B:
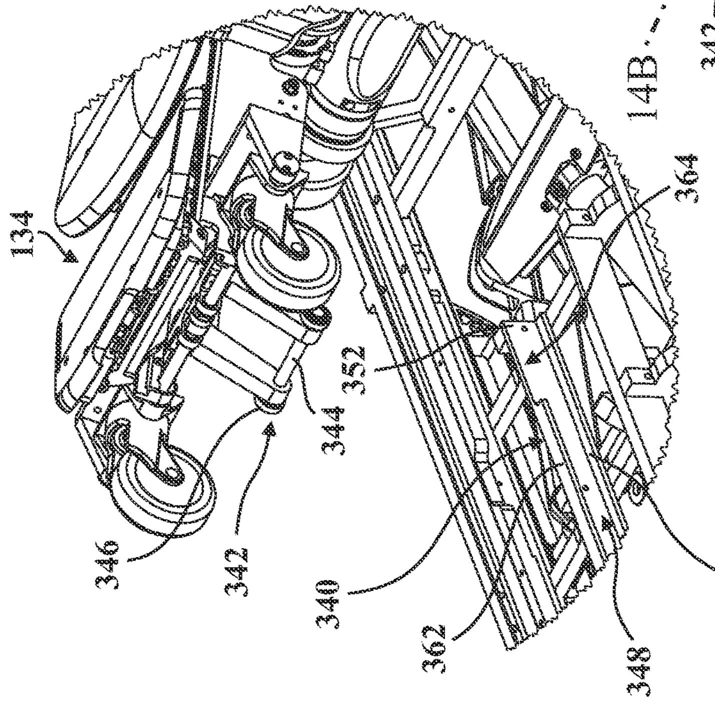
FIG. 14B is an enlarged partial perspective view taken at indicia 14B in FIG. 14A.

Referring to FIG. 13A-13B, the litter controller 156L may be configured to control the fowler actuator 178, the front actuator 180, and/or the rear actuator 182 to adjust the seat assembly 122, the front assembly 134, and/or the fowler assembly 128 such that the patient support surface 114 is arranged in a gatch configuration 114G (best shown in FIG. 13A). Referring to FIG. 13B, the second guide end 352 of the auxiliary guide 340 may define an auxiliary guide opening 364. The auxiliary guide opening 364 may be realized as a void defined in the auxiliary frame 344 where the top lip 360 terminates before the second guide end 352.

The auxiliary roller assembly 342 may be configured to be aligned with the auxiliary guide 364 opening when the auxiliary roller 346 of the auxiliary roller assembly 342 is in the second roller position 358. For example, when the patient support surface 114 is arranged in the gatch configuration 114G, the auxiliary roller assembly 342 may be arranged in the second roller position 358 such that the auxiliary roller 346 is aligned with the auxiliary guide opening 364. As such, the auxiliary roller assembly 342 will no longer be constrained from upward movement. Here, it will be appreciated that the arrangement of the auxiliary guide opening 364 allows selective vertical constraint of the auxiliary roller assembly 342 such that the patient support surface 114 may be arranged in configurations not typically possible for mobile patient transport apparatuses 102 such as cots. For example, referring to FIGS. 14A-14B, when the auxiliary roller assembly 342 is in the second roller position 358 such that the auxiliary roller 346 is aligned with the auxiliary guide opening 364, the litter controller 156L may be configured to control the fowler actuator 178, the front actuator 180, and/or the rear actuator 182 to align the auxiliary roller 346 of the auxiliary roller assembly 342 with the auxiliary guide opening 364 and to lift the auxiliary roller assembly 342 through the auxiliary guide opening 364 and out of the auxiliary channel 348 such that the patient support surface 114 may be arranged in a trend configuration 114T (e.g., a Trendelenburg position, a modified Trendelenburg position, and the like).

Referring now to FIGS. 15A-18B, the base 110 may also include a base lock 370 configured to limit translation of the litter 112 along the intermediate frame 118 when the litter 112 is in the litter forward position 112F. The base lock 370 may further include a base lock latch 372 configured to move between a first base lock latch position 374 and a second base lock latch position 376. In the first base lock position 374, the base lock latch 372 may be arranged to limit translation of the litter 112 along the intermediate frame 118. In the second base lock position, the base lock latch 372 may be arranged to allow translation of the litter 112 along the intermediate frame 118. The base lock 370 may be arranged near the auxiliary guide 340 such that aforementioned auxiliary frame 344 of the auxiliary roller assembly 342 is aligned with the base lock latch 372 as the auxiliary roller assembly 342 translates along the auxiliary guide 340 as the litter 112 translates from the cantilevered position CP to the litter forward position 112F.

Figure 15A:
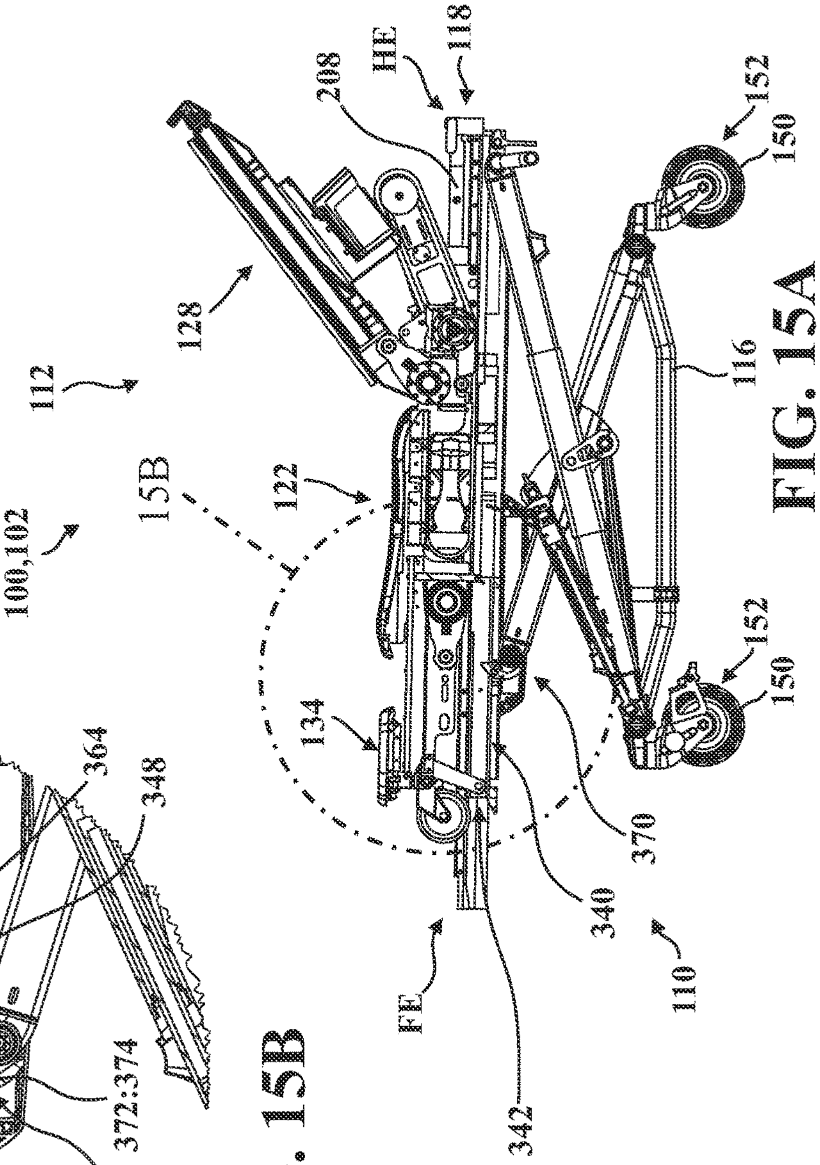
FIG. 15A is a sectional view taken along a longitudinal direction of portions of the patient transport apparatus arranged as depicted in FIG. 11A.
Figure 15B:
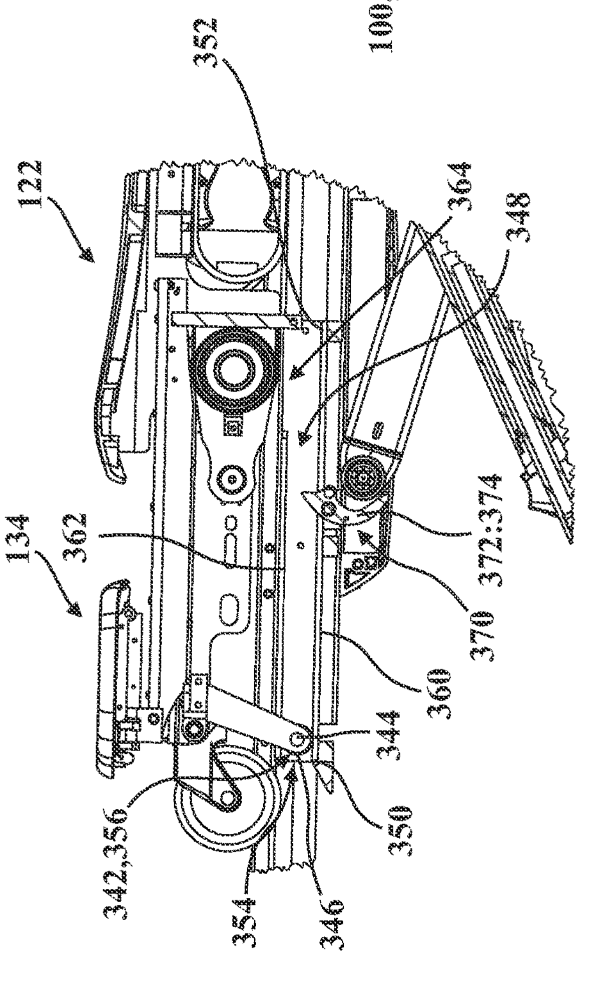
FIG. 15B is an enlarged partial sectional view taken at indicia 15B in FIG. 15A.
Figure 16A:
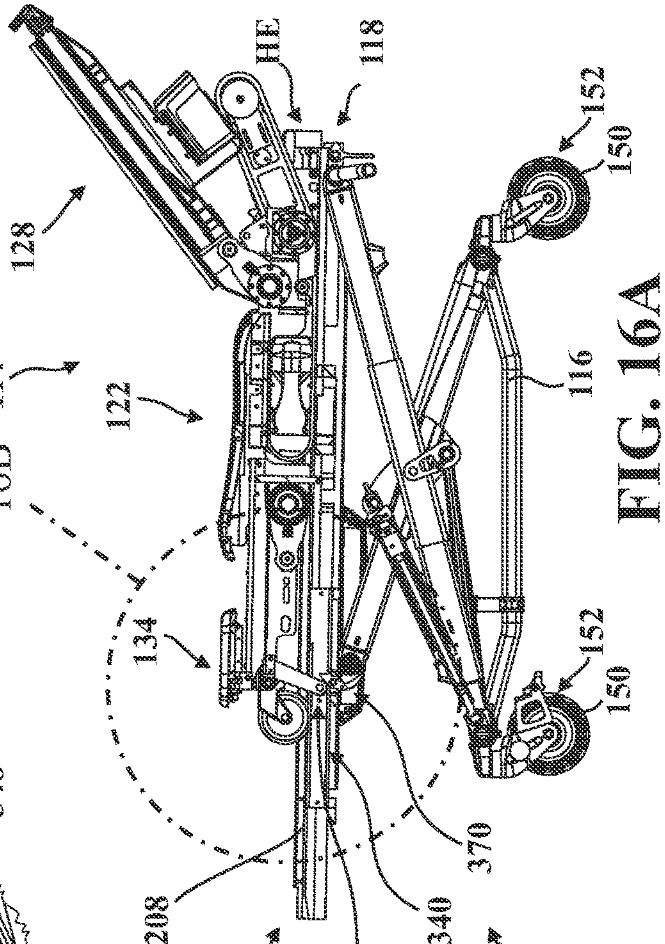
FIG. 16A is another sectional view of portions of the patient transport apparatus of FIG. 15A, shown depicting the litter having moved closer to a head end of the base.
Figure 16B:
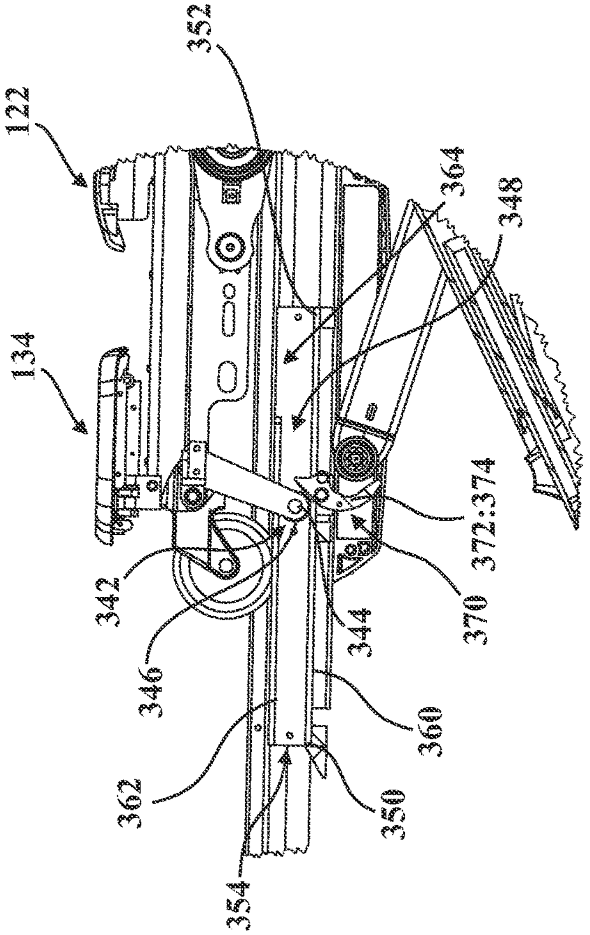
FIG. 16B is an enlarged partial sectional view taken at indicia 16B in FIG. 16A.
Figure 17A:
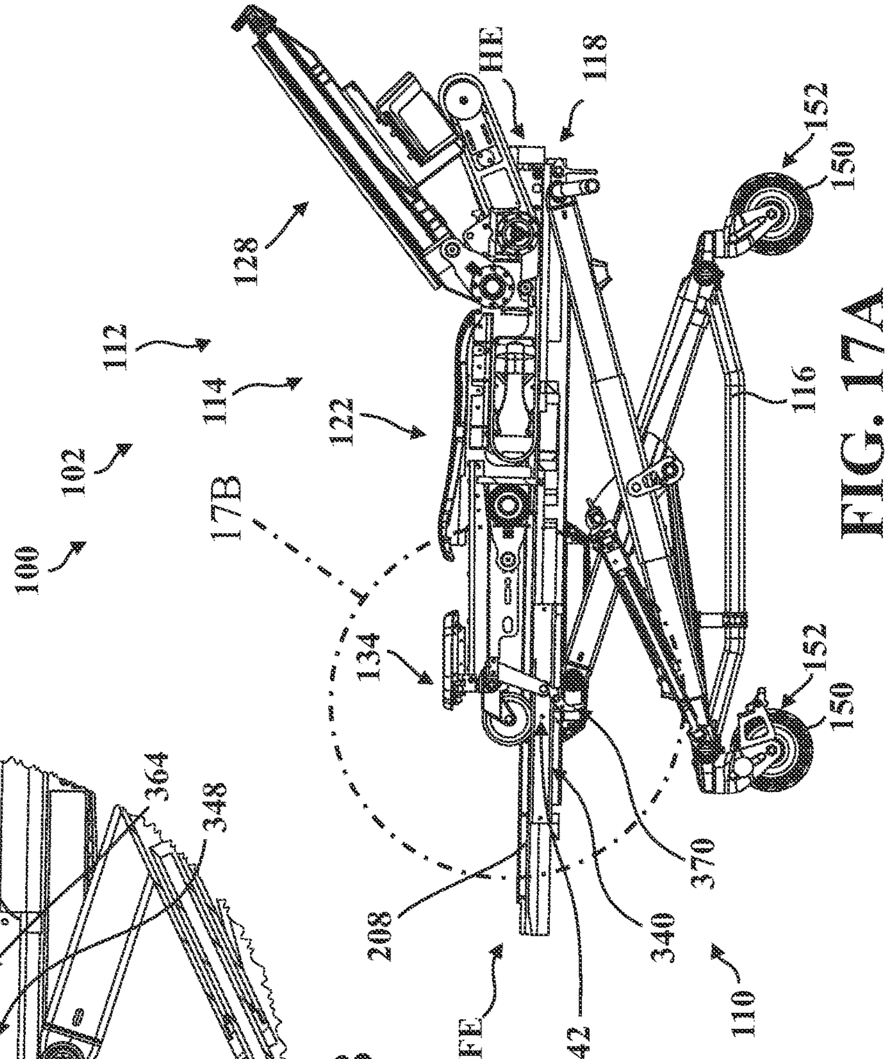
FIG. 17A is another sectional view of portions of the patient transport apparatus of FIG. 16A, shown depicting the litter having moved closer to the head end of the base.
Figure 17B:
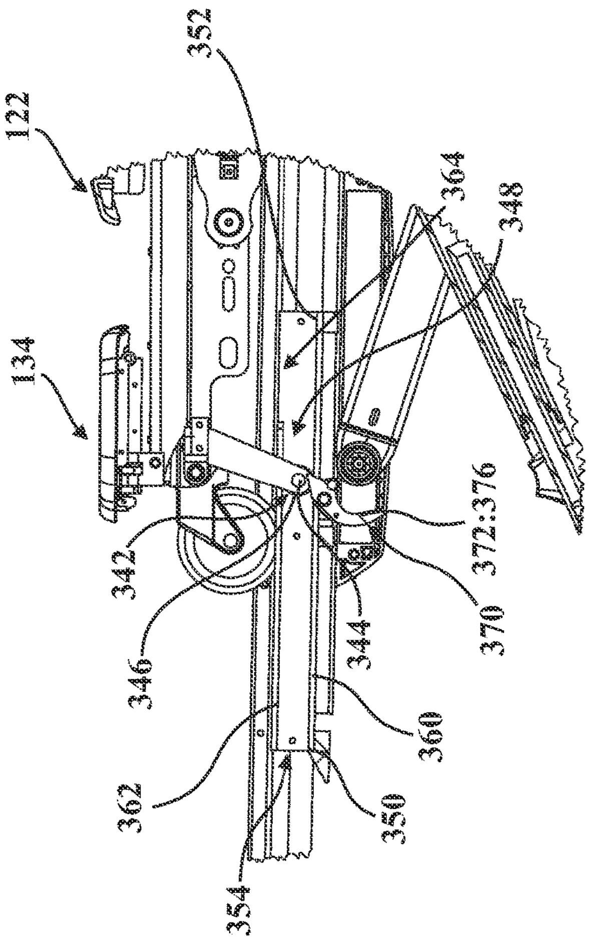
FIG. 17B is an enlarged partial sectional view taken at indicia 17B in FIG. 17A.
Figure 18B:
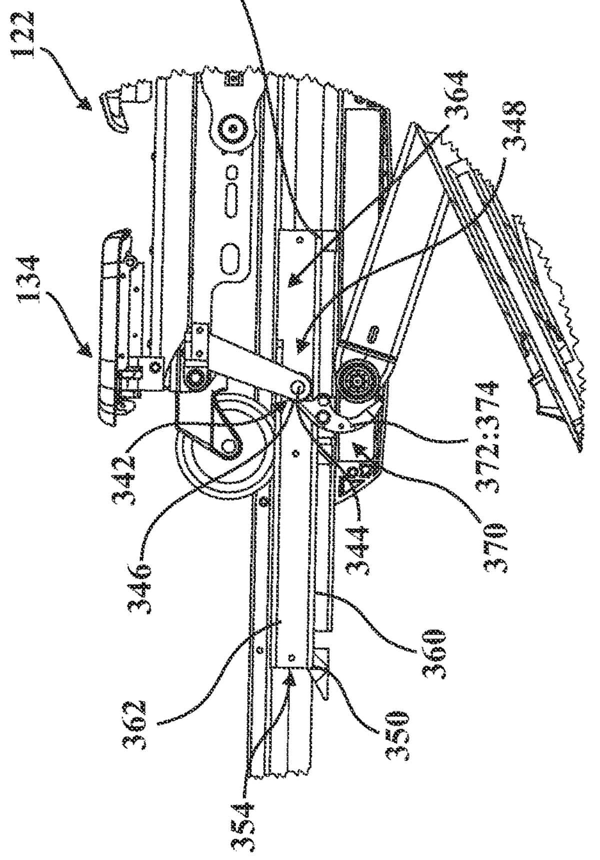
FIG. 18B is an enlarged partial sectional view taken at indicia 18B in FIG. 18A.
Figure 18A:
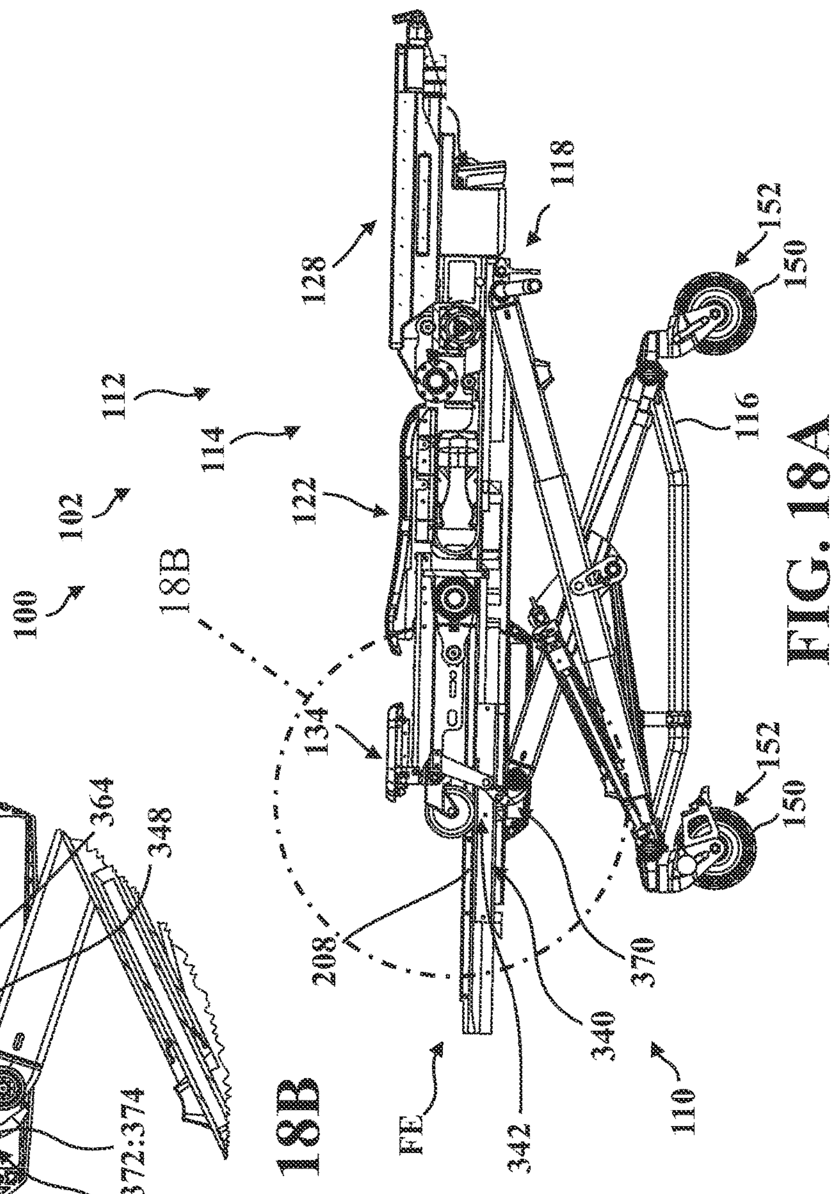
FIG. 18A is another sectional view of portions of the patient transport apparatus of FIG. 17A, depicting the litter secured to the base in the docked mode.

FIGS. 15A-18B illustrate the sequence of the base lock 370 being engaged to limit translation of the litter 112 along the intermediate frame 118. First, FIGS. 15A-15B show the auxiliary roller assembly 342 engaged with the auxiliary guide 340 and in the first roller position 356. FIGS. 16A-16B show the litter 112 translating toward the litter forward position 112F such that the auxiliary roller assembly 342 translates toward the second guide end 352. Here in FIGS. 16A-16B, the auxiliary frame 348 is shown abutting the base lock latch 372 in the first base lock latch position 374. Referring now to FIGS. 17A-17B, as the litter 112 and the auxiliary roller assembly 342 continue to translate, the auxiliary frame 348 likewise continues to abut the base lock latch 372, displacing the base lock latch 372 from the first base latch position 374 into the second base lock latch position 376, thereby allowing the auxiliary frame to translate past the base lock latch 372. FIGS. 18A-18B show the litter 112 in the litter forward position 112F such that the auxiliary frame 348 has been translated past the base lock latch 372. Additionally, FIGS. 18A-18B show the base lock latch 372 in the first base lock latch position 374. In this configuration, the base lock latch 372 is arranged such that the base lock latch 372 limits translation of the litter 112. Particularly, the base lock latch 372 is arranged such that, in the first base lock latch position 374, the base lock latch 372 abuts the auxiliary frame 344, thereby constraining transitional movement of the litter 112 relative to the intermediate frame 118. Thus, FIGS. 18A-18B show the base lock 370 in a locked configuration 370L to limit translation of the litter 112 along the intermediate frame 118 when the litter 112 is in the litter forward position 112F. In some versions, the base lock 370 may provide redundant constraints of movement of the litter 112 relative to the intermediate frame 118, and furthermore may provide further stability and rigidity to the patient transport apparatus 102 when operating in the docked mode MD.

In some versions, the base lock 370 may be configured to automatically limit translation of the litter 112 along the intermediate frame 118 when the litter 112 is moved to the litter forward position 112F. Here, for example, the base lock 370 may further include a base lock biasing element 378 that is arranged to urge the base lock latch 372 toward the first base lock position 374. Referring to FIGS. 17A-18B, the base lock biasing element 378 may urge the base lock latch 372 from the second base lock position 376 (shown in FIGS. 17A-17B) toward the first base lock position 374 (shown in FIGS. 18A-18B) when the litter 112 has been arranged in the litter forward position 112F in order to limit translation of the litter 112 relative to the intermediate frame 118 when the litter 112 is in the litter forward position 112F.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus for supporting a patient, the patient transport apparatus comprising:

- a base having a head end and a foot end, the base including:
  - a base frame arranged for movement about a ground surface,
  - an intermediate frame operatively coupled to the base frame and defining an intermediate rail extending between the foot end and the head end, the intermediate frame including an auxiliary guide arranged below the intermediate rail, and
  - a trolley configured to translate along the intermediate rail between a plurality of trolley positions including a trolley forward position where the trolley is arranged at the head end of the base and a trolley docking position where the trolley is arranged at the foot end of the base; and
- a litter configured to be docked to and undocked from the trolley such that, when docked to the trolley, the litter is supported by the trolley and is configured to slidably translate relative to the intermediate frame between a plurality of litter positions including a litter forward position, where the trolley is in the trolley forward position, and a cantilevered position, where the trolley is in the trolley docking position such that litter is cantilevered off the foot end of the base, the litter including:
  - a patient support surface for supporting the patient, and
  - an auxiliary roller assembly coupled to and extending from the litter and arranged for engagement with the auxiliary guide to provide an auxiliary point of contact to support the litter when the litter is docked to the trolley and the trolley is in the trolley forward position.

II. The patient transport apparatus of clause I, wherein the auxiliary guide defines an auxiliary channel extending from a first guide end arranged at the foot end of the intermediate frame toward the head end of the intermediate frame to define a second guide end.

III. The patient transport apparatus of clause II, wherein the first guide end defines a guide inlet, and the auxiliary roller assembly is arranged to engage the guide inlet as the litter translates from the cantilevered position to the litter forward position.

IV. The patient transport apparatus of clause III, wherein the auxiliary roller assembly is configured to moveably engage the auxiliary guide such that such that the auxiliary roller assembly rolls along the auxiliary guide.

V. The patient transport apparatus of any one of clauses II-IV, wherein the auxiliary roller assembly configured to translate along the auxiliary channel between a first roller position where the auxiliary roller assembly is aligned with the first guide end, and a second roller position where the auxiliary roller assembly is aligned with the second guide end.

VI. The patient transport apparatus of clause V, wherein the second guide end of the auxiliary guide defines an auxiliary guide opening and the auxiliary roller assembly is aligned with the auxiliary guide opening when the auxiliary roller assembly is in the second roller position.

VII. The patient transport apparatus of clause VI, wherein the patient support surface includes:

- a seat assembly having a front end and a rear end;
- a front assembly coupled to the front end of the seat assembly and arranged for movement relative to the seat assembly;
- a fowler assembly coupled to the rear end of the seat assembly and arranged for movement relative to the seat assembly;
- a fowler actuator arranged to articulate the fowler assembly relative to the seat assembly;
- a front actuator arranged to articulate the front assembly relative to the seat assembly; and
- a litter controller configured to control the fowler actuator and/or the front actuator.

VIII. The patient transport apparatus of clause VII, wherein the litter controller is configured to control the fowler actuator, the front actuator, or a combination thereof to align the auxiliary roller assembly with the auxiliary guide opening and to lift the auxiliary roller assembly through the auxiliary guide opening and out of the auxiliary channel such that the patient support surface is arranged in a trend configuration.

IX. The patient transport apparatus of any one of clauses VII-VIII, wherein the litter controller is configured to control the fowler actuator, the front actuator, or a combination thereof to adjust the seat assembly, the front assembly, and the fowler assembly such that the patient support surface is arranged in a gatch configuration.

X. The patient transport apparatus of any one of clauses VII-IX, wherein the litter controller is configured to control the fowler actuator, the front actuator, or a combination thereof to adjust the seat assembly, the front assembly, and the fowler assembly such that the patient support surface is arranged in a flat configuration.

XI. The patient transport apparatus of any one of clauses I-X, wherein the base includes a base lock configured to limit translation of the litter along the intermediate frame when the litter is in the litter forward position.

XII. The patient transport apparatus of clause XI, wherein the base lock includes a base lock latch configured to move between a first base lock latch position where the base lock latch is arranged to limit translation of the litter along the intermediate frame, and a second base lock latch position where the base lock latch is arranged to allow translation of the litter along the intermediate frame.

XIII. The patient transport apparatus of clause XII, wherein the auxiliary roller assembly further includes an auxiliary frame extending from the litter such that the auxiliary frame is aligned with the base lock latch as the litter translates between the cantilevered position and the litter forward position.

XIV. The patient transport apparatus of clause XIII, wherein, as the litter translates from the cantilevered position to the litter forward position, the auxiliary frame is configured to abut the base lock latch such that the base lock latch moves from the first base lock latch position to the second base lock latch position, allowing the auxiliary frame to translate past the base lock latch.

XV. The patient transport apparatus of clause XIV, wherein the base lock latch is configured to abut the auxiliary frame to limit translation of the litter relative to the intermediate frame when the base lock latch in in the first base lock latch position and when the litter is in the litter forward position.

XVI. The patient transport apparatus of clause XV, wherein the base lock further includes a base lock biasing element arranged to urge the base lock latch toward the first base lock latch position such that the base lock latch is configured to move to the first base lock latch position to limit translation of the litter relative to the intermediate frame when the litter is in the litter forward position.

What is claimed is:

1. A patient transport apparatus for supporting a patient, the patient transport apparatus comprising:
   - a base having a head end and a foot end, the base including:
     - a base frame arranged for movement about a ground surface,
     - an intermediate frame operatively coupled to the base frame and defining an intermediate rail extending between the foot end and the head end, the intermediate frame including an auxiliary guide arranged below the intermediate rail, and
     - a trolley configured to translate along the intermediate rail between a plurality of trolley positions including a trolley forward position where the trolley is arranged at the head end of the base and a trolley docking position where the trolley is arranged at the foot end of the base; and
   - a litter configured to be docked to and undocked from the trolley such that, when docked to the trolley, the litter is supported by the trolley and is configured to slidably translate relative to the intermediate frame between a plurality of litter positions including a litter forward position, where the trolley is in the trolley forward position, and a cantilevered position, where the trolley is in the trolley docking position such that litter is cantilevered off the foot end of the base, the litter including:
     - a patient support surface for supporting the patient, and
     - an auxiliary roller assembly coupled to and extending from the litter and arranged for engagement with the auxiliary guide to provide an auxiliary point of contact to support the litter when the litter is docked to the trolley and the trolley is in the trolley forward position.

2. The patient transport apparatus of claim 1, wherein the auxiliary guide defines an auxiliary channel extending from a first guide end arranged at the foot end of the intermediate frame toward the head end of the intermediate frame to define a second guide end.

3. The patient transport apparatus of claim 2, wherein the first guide end defines a guide inlet, and the auxiliary roller assembly is arranged to engage the guide inlet as the litter translates from the cantilevered position to the litter forward position.

4. The patient transport apparatus of claim 3, wherein the auxiliary roller assembly is configured to moveably engage the auxiliary guide such that such that the auxiliary roller assembly rolls along the auxiliary guide.

5. The patient transport apparatus of claim 2, wherein the auxiliary roller assembly is configured to translate along the auxiliary channel between a first roller position where the auxiliary roller assembly is aligned with the first guide end, and a second roller position where the auxiliary roller assembly is aligned with the second guide end.

6. The patient transport apparatus of claim 5, wherein the second guide end of the auxiliary guide defines an auxiliary guide opening and the auxiliary roller assembly is aligned with the auxiliary guide opening when the auxiliary roller assembly is in the second roller position.

7. The patient transport apparatus of claim 6, wherein the patient support surface includes:
   - a seat assembly having a front end and a rear end;
   - a front assembly coupled to the front end of the seat assembly and arranged for movement relative to the seat assembly;
   - a fowler assembly coupled to the rear end of the seat assembly and arranged for movement relative to the seat assembly;
   - a fowler actuator arranged to articulate the fowler assembly relative to the seat assembly;
   - a front actuator arranged to articulate the front assembly relative to the seat assembly; and
   - a litter controller configured to control the fowler actuator and/or the front actuator.

8. The patient transport apparatus of claim 7, wherein the litter controller is configured to control the fowler actuator, the front actuator, or a combination thereof to align the auxiliary roller assembly with the auxiliary guide opening and to lift the auxiliary roller assembly through the auxiliary guide opening and out of the auxiliary channel such that the patient support surface is arranged in a trend configuration.

9. The patient transport apparatus of claim 7, wherein the litter controller is configured to control the fowler actuator, the front actuator, or a combination thereof to adjust the seat assembly, the front assembly, and the fowler assembly such that the patient support surface is arranged in a gatch configuration.

10. The patient transport apparatus of claim 7, wherein the litter controller is configured to control the fowler actuator, the front actuator, or a combination thereof to adjust the seat assembly, the front assembly, and the fowler assembly such that the patient support surface is arranged in a flat configuration.

11. The patient transport apparatus of claim 1, wherein the base includes a base lock configured to limit translation of the litter along the intermediate frame when the litter is in the litter forward position.

12. The patient transport apparatus of claim 11, wherein the base lock includes a base lock latch configured to move between a first base lock latch position where the base lock latch is arranged to limit translation of the litter along the intermediate frame, and a second base lock latch position where the base lock latch is arranged to allow translation of the litter along the intermediate frame.

13. The patient transport apparatus of claim 12, wherein the auxiliary roller assembly further includes an auxiliary frame extending from the litter such that the auxiliary frame is aligned with the base lock latch as the litter translates between the cantilevered position and the litter forward position.

14. The patient transport apparatus of claim 13, wherein, as the litter translates from the cantilevered position to the litter forward position, the auxiliary frame is configured to abut the base lock latch such that the base lock latch moves from the first base lock latch position to the second base lock latch position, allowing the auxiliary frame to translate past the base lock latch.

15. The patient transport apparatus of claim 14, wherein the base lock latch is configured to abut the auxiliary frame to limit translation of the litter relative to the intermediate frame when the base lock latch is in the first base lock latch position and when the litter is in the litter forward position.

16. The patient transport apparatus of claim 15, wherein the base lock further includes a base lock biasing element arranged to urge the base lock latch toward the first base lock latch position such that the base lock latch is configured to move to the first base lock latch position to limit translation of the litter relative to the intermediate frame when the litter is in the litter forward position.

* * * * *